United States Patent [19]
Hayakawa et al.

[11] Patent Number: 6,090,489
[45] Date of Patent: *Jul. 18, 2000

[54] METHOD FOR PHOTOCATALYTICALLY HYDROPHILIFYING SURFACE AND COMPOSITE MATERIAL WITH PHOTOCATALYTICALLY HYDROPHILIFIABLE SURFACE

[75] Inventors: Makoto Hayakawa; Eiichi Kojima; Keiichiro Norimoto; Mitsuyoshi Machida; Atsushi Kitamura; Toshiya Watanabe; Makoto Chikuni, all of Nakashima; Akira Fujishima, Nakahara-ku; Kazuhito Hashimoto, Hongoudai, all of Japan

[73] Assignee: Toto, Ltd., Fukuoka-ken, Japan

[*] Notice: This patent is subject to a terminal disclaimer.

[21] Appl. No.: 09/091,692

[22] Filed: Jun. 19, 1998

[51] Int. Cl.[7] .................................. B32B 9/00; B05D 3/04
[52] U.S. Cl. ........................ 428/409; 428/411.1; 427/301; 427/333
[58] Field of Search ..................................... 427/301, 333; 428/409, 403, 411.1

[56] References Cited

U.S. PATENT DOCUMENTS

| | | | |
|---|---|---|---|
| 3,347,816 | 10/1967 | Krauss et al. | 260/37 |
| 3,451,833 | 6/1969 | Bonitz et al. | 106/287 |

(List continued on next page.)

FOREIGN PATENT DOCUMENTS

| | | | |
|---|---|---|---|
| 0433915 | 6/1991 | European Pat. Off. | |
| 0590477A1 | 4/1994 | European Pat. Off. | |
| 0636702 | 2/1995 | European Pat. Off. | |
| 149281/78 | 12/1978 | Japan . | |
| 60-221702 | 11/1985 | Japan . | |
| 61-083106 | 4/1986 | Japan | A01N 59/00 |
| 61-091042 | 5/1986 | Japan | C03C 17/245 |

(List continued on next page.)

OTHER PUBLICATIONS

Hyomen (Surface), vol. 27, No. 9 (1989).
Denki Kagaku, vol. 54, No. 2 (1986).
The Chemical Society of Japan, 1986, (1), 8–11.
Denki Kagaku, vol. 54, No. 2, 1986 (no month), no author, abstract only, 1986.
The Chemical Society of Japan, 1986 (1), pp. 8–11, (no month), no author, abstract only, 1986.
"Sulfated Metal Oxides and Related Solid Acids; Comparison of Protonic Acid Strengths", Energy and Fuels, 1995, 9, 888–893 (no month), 1995.
The Modern Theory of Contact Angles and the Hydrogen Bond Components of Surface Energies:, Robert J. Good, pp. 1–27, Jan. 27, 1992.
Denki Kagaku, vol. 54, No. 2 (1986) (no month) (abstract only) (no author).
The Chemical Society of Japan, 1986, (1), 8–11 (no month) (abstract only) (no author).

*Primary Examiner*—Timothy Meeks
*Assistant Examiner*—Paul D. Strain
*Attorney, Agent, or Firm*—Jones, Day, Reavis & Pogue

[57] ABSTRACT

A method for hydrophilifying the surface of a substrate by taking advantage of photocatalytic action. The substrate has a photocatalytic titania coating (10). The surface of the photocatalytic coating (10) bears the solid acid that increases a hydrogen bond component ($\gamma_s^h$) in the surface energy in the solid/gas interface of the coating. Photoexcitation of the photocatalyst enhances the hydrogen bond component ($\gamma_s^h$) in the surface energy of the photocatalytic coating (10), accelerating the physical adsorption of molecules of water in the atmosphere through a hydrogen bond (16) onto hydrogen atoms in a terminal OH group (12), bonded to a titanium atom, and a bridge OH group (14) on the surface of the coating. This results in the formation of a high density, physically adsorbed water layer (18) on the surface of the photocatalytic coating (10), thus permitting the surface of the substrate to be easily hydrophilified. The method is applicable to antifogging, antifouling, selfcleaning and cleaning of articles.

29 Claims, 9 Drawing Sheets

U.S. PATENT DOCUMENTS

| | | |
|---|---|---|
| 3,640,712 | 2/1972 | Field et al. . |
| 3,871,881 | 3/1975 | Mikelsons ................... 96/1.5 |
| 3,976,497 | 8/1976 | Clark ......................... 106/287 |
| 4,954,465 | 9/1990 | Kawashima et al. ............. 502/5 |
| 4,955,208 | 9/1990 | Kawashima et al. ............. 502/5 |
| 5,536,448 | 7/1996 | Takahashi et al. ............ 428/403 |
| 5,547,823 | 8/1996 | Murasawa et al. ............. 427/212 |
| 5,595,813 | 1/1997 | Ogawa et al. . |
| 5,616,532 | 4/1997 | Heller et al. ................ 502/242 |
| 5,643,436 | 7/1997 | Ogawa et al. . |
| 5,668,076 | 9/1997 | Yamagushi et al. ............ 502/343 |
| 5,688,439 | 11/1997 | Chopin et al. ............... 428/403 |
| 5,755,867 | 5/1998 | Chikuni et al. .............. 106/287.16 |
| 5,786,414 | 7/1998 | Chikuni et al. .............. 524/413 |
| 5,853,866 | 12/1998 | Watanabe et al. ............. 427/214 |
| 5,874,701 | 2/1999 | Watanabe et al. ............. 204/157.15 |

FOREIGN PATENT DOCUMENTS

| | | | |
|---|---|---|---|
| 91042/86 | 5/1986 | Japan . | |
| 63-005301 | 1/1988 | Japan . | |
| 63-100042 | 5/1988 | Japan .............. | C03C 17/23 |
| 1-189322 | 7/1989 | Japan . | |
| 1-218635 | 8/1989 | Japan . | |
| 1-288321 | 11/1989 | Japan . | |
| 3-101926 | 4/1991 | Japan . | |
| 174679/92 | 6/1992 | Japan . | |
| 4-174679 | 6/1992 | Japan . | |
| 302173/93 | 11/1993 | Japan . | |
| 5-302173 | 11/1993 | Japan . | |
| 6-278241 | 10/1994 | Japan . | |
| 6-298520 | 10/1994 | Japan .............. | C01B 33/16 |
| 6-315614 | 11/1994 | Japan . | |
| 7-051646 | 2/1995 | Japan . | |
| 7-100378 | 4/1995 | Japan . | |
| 7-113272 | 5/1995 | Japan . | |
| 7-171408 | 7/1995 | Japan . | |
| 7-303835 | 11/1995 | Japan . | |
| 7-331120 | 12/1995 | Japan . | |
| 8-119673 | 5/1996 | Japan .............. | C03C 17/23 |
| 8-164334 | 6/1996 | Japan . | |
| 8-313705 | 11/1996 | Japan .............. | G02B 1/10 |
| 9-173783 | 7/1997 | Japan . | |
| 9-227157 | 9/1997 | Japan . | |
| 9-227158 | 9/1997 | Japan . | |
| 9-235140 | 9/1997 | Japan . | |
| 9-241037 | 9/1997 | Japan . | |
| WO 95/11751 | 5/1995 | WIPO .............. | B01J 21/06 |
| WO95/11751 | 5/1995 | WIPO . | |

(313 nm)

(365 nm)

(405 nm)

METHOD FOR PHOTOCATALYTICALLY HYDROPHILIFYING SURFACE AND COMPOSITE MATERIAL WITH PHOTOCATALYTICALLY HYDROPHILIFIABLE SURFACE

TECHNICAL FIELD

The present invention relates to a method for hydrophilifying the surface of articles (i.e., rendering the surface of articles hydrophilic) by the action of a photocatalyst, and also to a composite with a hydrophilifiable surface formed of a photocatalyst. It can be utilized for antifogging, antifouling, and selfcleaning of articles and other applications.

BACKGROUND ART

The present inventor has previously proposed a method for highly hydrophilifying the surface of articles by the action of a photocatalyst (International Publication No. WO96/29375). According to this method, a coating of a semiconductor photocatalyst, such as the anatase form of titania, is provided on the surface of an article. Photoexcitation of this photocatalytic coating by exposure to light having a satisfactory intensity for a satisfactory period of time permits the surface of the photocatalytic coating to be highly hydrophilified to such an extent as will make a contact angle with water of about 0°.

As disclosed in WO96/29375, the above highly hydrophilifiable photocatalytic coating is applicable to various articles for antifogging, antifouling, selfcleaning and other various purposes. For example, when the photocatalytic coating is provided on a transparent article, such as a windshield for a vehicle, a windowpane for a building, or an eyeglass lens, or a mirror, the surface of the coating is highly hydrophilified upon photoexcitation of the photocatalyst, preventing the article from being fogged by moisture condensate or steam or from being blurred by water droplets adhering on the surface thereof. Further, when a building or an article, which is disposed outdoors, is provided with the photocatalytic coating, oil repellent or hydrophobic dust and contaminants adhering on the hydrophilified surface are washed away by raindrops every time they are exposed to rainfall, thus permitting the surface to be selfcleaned.

Various light sources capable of emitting light having higher energy than the band gap energy of a photocatalyst, a semiconductor, are utilized for the photoexcitation of the photocatalyst. In the case of a photocatalyst, of which the photoexcitation wavelength is in the ultraviolet region, such as titania, ultraviolet light is necessary for the photoexcitation of such a photocatalyst. In this case, when the article is in such a state as will be exposed to the sunlight, the photocatalyst can be advantageously photoexcited by ultraviolet light contained in the sunlight.

So far as the photoexcitation continues, the surface of the photocatalytic coating permanently retains its hydrophilic property. Interruption of the photoexcitation results in gradual decreased hydrophilicity of the surface of the photocatalytic coating. This is considered attributable to the fact that the surface of the photocatalytic coating is gradually contaminated with a hydrophobic material. As soon as the photocatalyst is photoexcited again, the hydrophilicity is recovered.

In the case of photoexcitation in a discontinuous manner like photoexcitation of the photocatalyst by the sunlight, the hydrophilicity of the surface of the photocatalytic coating is attenuated upon the interruption of the photoexcitation, while the resumption of the photoexcitation results in recovery of the hydrophilicity. Thus, the attenuation and the recovery of the hydrophilicity are alternately repeated.

A primary object of the present invention is to improve the above conventional method, enabling a surface to be hydrophilified more easily.

Another object of the present invention is to improve the above conventional method, enabling a surface to be highly hydrophilified upon exposure to weaker light, that is, lower irradiation intensity.

Still another object of the present invention is to provide a method which, even when photoexcitation is interrupted or when an article is placed in the dark, enables a high level of hydrophilicity imparted to a surface to be kept for as long a period of time as possible.

A further object of the present invention is to provide a method which, when photoexcitation is resumed after interruption of the photoexcitation, enables the hydrophilicity of a surface to be recovered upon exposure to light for a short period of time or upon exposure to weak light.

A still further object of the present invention is to provide a composite for use in practice of the above methods.

DISCLOSURE OF INVENTION

It is known that the surface energy $\gamma_S$ in the interface of a solid and a gas is constituted by three components, a molecular dispersion force $\gamma_S^d$, a dipole moment component $\gamma_S^P$, and a hydrogen bond component $\gamma_S^h$.

The present inventor has found that hydrophilification of the surface of a photocatalytic coating upon photoexcitation of a photocatalyst gives rise to a significant increase in only the hydrogen bond component $\gamma_S^h$ among the three components in the surface energy $\gamma_S$.

The present inventor has further found that the hydrophilification of the photocatalytic coating is attributable to the physical adsorption of water on the surface of the photocatalytic coating by photocatalytic action.

This invention has been made based on such finding, and, according to the present invention, a photocatalytic coating containing a photocatalyst is provided on a substrate. Upon photoexcitation of the photocatalyst by irradiation of the photocatalytic coating with light, the photocatalytic action brings about an increase in the hydrogen bond component $\gamma_S^h$ in the surface energy $\gamma_S$ in the solid/gas interface of the photocatalytic coating, accelerating the physical adsorption of molecules of water through a hydrogen bond, which results in the formation of a high-density physically adsorbed water layer on the surface of the photocatalytic coating.

Thus, the formation of a physically adsorbed water layer on the surface of the photocatalytic coating facilitates a high level of hydrophilification. By virtue of the presence of the physically adsorbed water layer, the hydrophilicity of the surface of the photocatalytic coating is kept for a long period of time even after the interruption of photoexcitation, minimizing the attenuation of the hydrophilicity. When the photocatalyst is photoexcited again, the hydrophilicity of the surface can be easily recovered upon exposure of the surface to light for a short period of time or upon exposure of the surface to weak light.

According to the present inventor's finding, the hydrophilicity of the surface of the photocatalytic coating is related to the hydrogen bond component $\gamma_S^h$ in the surface energy. Therefore, according to a preferred embodiment of the present invention, the solid material that increases a hydrogen bond component $\gamma_S^h$ in the surface energy in the solid/gas interface is borne on the photocatalytic coating.

Since this enhances the hydrogen bond component $\gamma_S^h$ inherent in the surface energy of the photocatalytic coating (i.e., during non-excitation of the photocatalyst), the hydrogen bond component in the surface energy during photoexcitation of the photocatalyst is further enhanced accordingly. This in turn permits the formation of the physically adsorbed water layer by the photocatalytic action to be further promoted. In addition, a reduction in physically adsorbed water layer upon interruption of the photoexcitation is delayed.

Materials that increase a hydrogen bond component $\gamma_S^h$ in the surface energy of the photocatalytic coating include solid acids which serve as a proton donor (Brønsted acid) or as an electron acceptor (Lewis acid), and solid bases which serve as an electron donor (Lewis base) or as a proton acceptor (Brønsted base). These solid acids or solid bases per se have a high hydrogen bond component $\gamma_S^h$ and, hence, when borne on the surface of the photocatalytic coating, enhance the hydrogen bond component $\gamma_S^h$ in the surface of the photocatalytic coating.

Such solid acids include, for example, metal oxides bearing sulfuric acid, metal oxides bearing nitric acid, compound oxides of metals, and $Al_2O_3.SiO_2$. Compound oxides of metals include metal oxide superacids, $TiO_2/WO_3$, $WO_3/ZrO_2$, and $WO_3/SnO_2$. The oxide superacid is defined as a solid oxide having higher acid strength than 100% sulfuric acid and has an acid strength of Ho $\leq -11.93$ wherein Ho represents the Hammett acidity function.

The present inventor has further found that the contact angle of the solid surface with an oil in water increases with increasing the hydrogen bond component $\gamma_S^h$ in the surface energy in the surface of the photocatalytic coating.

Therefore, according to another aspect of the present invention, there is provided a method for improving the oil repellency of the surface of a substrate in water. According to the present invention, a photocatalytic coating containing a photocatalyst is provided on a substrate. Upon photoexcitation of the photocatalyst by irradiation of the photocatalytic coating with light, the hydrogen bond component $\gamma_S^h$ in the surface energy $\gamma_S$ in the solid/gas interface of the photocatalytic coating is enhanced by photocatalytic action, improving the oil repellency of the surface of the substrate in water.

This method for improving the oil repellency of a surface in water can be utilized for cleaning a substrate stained with an oil. Specifically, when a photocatalytic coating with an oil adhering thereon is immersed in or wetted with water, the oil stain is easily released and removed from the surface of the photocatalytic coating without use of any detergent.

The foregoing and other features and advantages of the present invention will become more apparent in the light of the following description of embodiments.

BEST MODE FOR CARRYING OUT THE INVENTION

Figure 1A:
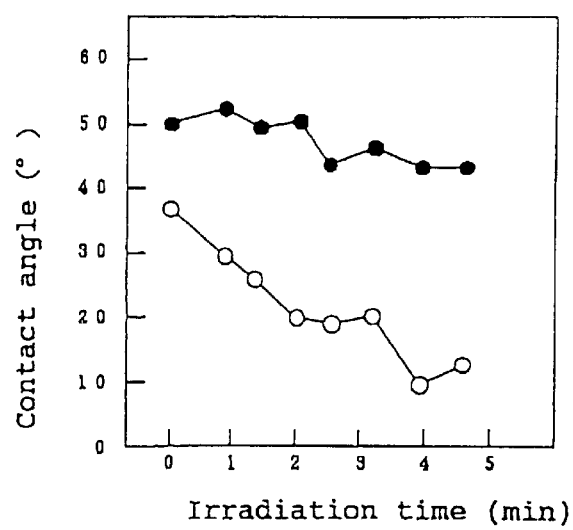
FIGS. 1A, 1B, and 1C are graphs showing a change in contact angle of the surface of a photocatalytic coating with water upon irradiation of the surface of the photocatalytic coating with ultraviolet rays having different wavelengths as a function of light irradiation time.

The hydrophilic photocatalytic coating may be provided on various articles according to purposes.

When antifogging is contemplated for eliminating optical problems caused by adherence of moisture condensate or water droplets, a hydrophilic photocatalytic coating may be provided on the following articles: windowpanes for buildings; windowpanes and windshields for vehicles and vessels, such as automobiles, railway vehicles, aircrafts, watercrafts, and submarines; mirrors, such as rearview mirrors for vehicles, bathroom or lavatory mirrors, dental mouth mirrors, and reflecting mirrors such as used in roads; lenses, such as eyeglass lenses, optical lenses, photographic lenses, endoscopic lenses, and lighting lenses; shields of goggles or masks (including diving masks) for protection and sports; shields of helmets; and cover glasses for measuring instruments.

Further, provision of a hydrophilic photocatalytic coating on the surface of a building, a construction, machinery, or an article, which is disposed outdoors, permits the surface thereof to be selfcleaned. Furthermore, provision of a photocatalytic coating on an article having a fear of coming into contact with dust or an exhaust gas can prevent the adherence of hydrophobic dust on the surface of the article.

When utilization of the oil repellency of a photocatalytic coating in water is contemplated for simply removing an oil stain, the photocatalvtic coating may be provided on machinery and parts, tableware, kitchen utensils or other articles which are likely to be stained with an oil.

Photocatalyst

Titania ($TiO_2$) is most preferred as the photocatalyst for a photocatalytic coating. Titania is harmless, chemically stable, and inexpensive. Further, the band gap energy of titania is so high that titania requires ultraviolet light for photoexcitation and does not absorb visible light in the course of photoexcitation, causing no color development derived from a complementary color component. The photocatalytic coating using titania as a photocatalyst is suitable particularly as a coating for transparent members such as glass, lenses, and mirrors. Although the rutile form of titania also is usable, the anatase form of titania is preferred. The anatase form of titania is advantageous in that a sol containing very fine particles dispersed therein may be easily commercially available which can easily form a very thin film. When a highly hydrophilifiable photocatalytic coating is desired, the use of a nitric acid peptization type titania sol is preferred.

Other photocatalysts usable herein include metal oxides such as ZnO, $SnO_2$, $SrTiO_3$, $WO_3$, $Bi_2O_3$, and $Fe_2O_3$. The surface of these metal oxide photocatalysts is considered to be easily hydrophilified because, as with titania, each of these metal oxide photocatalysts has a metal element and oxygen on its surface.

Formation of Photocatalytic Coating

A photocatalytic coating may be provided on a substrate by various methods disclosed in WO96/29375, the disclosure of which is here incorporated by reference Briefly speaking, one preferred method for the formation of a photocatalytic coating, possessing excellent abrasion resistance and highly hydrophilifiable to such an extent as will make a contact angle with water of 0°, on a substrate made of a heat-resistant material, such as a metal, a ceramic, or glass, is to first coat the surface of the substrate with amorphous titania by hydrolysis and dehydration polycondensation of an organotitanium compound, for example, tetraethoxytitanium, followed by firing at a temperature of 400 to 600° C. to transform the amorphous titania into crystalline titania (anatase).

Another preferred method for the formation of a photocatalytic coating possessing excellent abrasion resistance and highly hydrophilifiable to such an extent as will make a contact angle with water of 0° is to incorporate silica or tin oxide into photocatalytic titania.

Still another preferred method for the formation of a photocatalytic coating superhydrophilifiable to such an extent as will make a contact angle with water of 0°, on a substrate made of a non-heat-resistant material, such as a plastic, or a substrate coated with an organic paint is to use a composition, for a paint, comprising a coating forming element of an uncured or partially cured silicone (organopolysiloxane) or a precursor of a silicone and photocatalyst particles dispersed in the element.

As disclosed in WO96/29375, when the above composition for a paint is coated on the surface of a substrate to form a coating which is then subjected to curing of the coating forming element to form a silicone coating followed by photoexcitation of the photocatalyst, an organic group bonded to a silicon atom of the silicone molecule is substituted by a hydroxyl group through the photocatalytic action of the photocatalyst, rendering the surface of the photocatalytic coating superhydrophilic.

Bearing of Surface Energy Enhancer

A solid acid or a solid base may be borne on the photocatalytic coating to enhance the hydrogen bond component in the surface energy of the photocatalytic coating, thereby accelerating the physical adsorption of water.

For example, sulfuric acid or nitric acid may be borne as the solid acid by previously providing a photocatalytic titania coating on a substrate, coating sulfuric acid or nitric acid on the photocatalytic titania coating, and conducting heat treatment at a temperature of about 400 to 600° C. This causes a sulfonic or nitric group to be bonded to a titanium atom present on the surface of titania, enhancing the hydrogen bond component in the surface energy. Sulfonic acid or picric acid may be used instead of sulfuric acid or nitric acid.

Alternatively, a compound oxide of metals or $Al_2O_3.SiO_2$ may be borne as the solid acid. In this case, $TiO_2/WO_3$, when fired at a temperature of 600 to 800° C., exhibits the highest acidity and, at that time, has a Hammett acidity function Ho of −13 to −14; $WO_3/SnO_2$, when fired at a temperature of 900 to 1100° C., exhibits the highest acidity and, at that time, has a Hammett acidity function Ho=−13 to −14; $WO_3/ZrO_2$, when fired at a temperature of 700 to 900° C., exhibits the highest acidity and, at that time, has a Hammett acidity function Ho of −13 to −15; $WO_3/Fe_2O_3$, when fired at a temperature of 600 to 800° C., exhibits the highest acidity and, at that time, has a Hammett acidity function of Ho of −12 to −13; and $Al_2O_3.SiO_2$, when fired at a temperature of 400 to 600° C., exhibits the highest acidity and, at that time, has a Hammett acidity function Ho of −12 to −13.

Therefore, $TiO_2/WO_3$, $WO_3/ZrO_2$, and $WO_3/SnO_2$ are preferred from the viewpoint of the magnitude of the acidity.

On the other hand, when the formation of a photocatalytic coating on a glass substrate is contemplated, preferred is $Al_2O_3.SiO_2$ which, when fired at a temperature of 400 to 600° C. which does not significantly soften the glass substrate, exhibits the highest acidity When a compound oxide of metals is borne as the solid acid, it is possible to use oxide particles or a metallic acid containing at least part of metallic elements constituting the compound oxide of metals. In this case, a photocatalytic titania coating is previously provided on a substrate, the oxide particles or metallic acid is coated on the photocatalytic coating, and firing is performed at such a temperature that the compound oxide of metals exhibits high acidity.

Light Source for Excitation of Photocatalyst

Photoexcitation of a photocatalyst in the photocatalytic coating requires irradiation of the photocatalyst with light at a wavelength having higher energy than the band gap energy of the photocatalyst which is a semiconductor. Ultraviolet light is necessary for the excitation of some photocatalysts. For example, photoexcitation is possible with ultraviolet light at a wavelength of not more than 387 nm for the anatase form of titania, at a wavelength of not more than 413 nm for the rutile form of titania, at a wavelength of not more than 344 nm for tin oxide, and at a wavelength of not more than 387 nm for zinc oxide.

In the case of a photocatalyst, of which the excitation wavelength is in the ultraviolet region, such as titania, sources usable for ultraviolet light include an ultraviolet lamp, a mercury lamp, and a metal halide lamp. Further, weak ultraviolet light contained in light emitted from room lamps, such as fluorescent lamps and incandescent lamps, also can excite the photocatalyst.

In the case of articles in such a state as will be exposed to the sunlight, such as windowpanes for buildings, rearview mirrors, and articles which are disposed outdoors, the photocatalyst can be advantageously photoexcited by taking advantage of ultraviolet light contained in sunlight.

Hydrophilification of Surface

Photoexcitation of a photocatalyst by irradiation of the photocatalytic coating with light permits the surface of the photocatalytic coating to be highly hydrophilified. Interruption of the photoexcitation results in gradual attenuation of the hydrophilicity of the photocatalytic coating, and the hydrophilicity is recovered upon re-photoexcitation. For example, in the case of excitation of the photocatalyst in the photocatalytic coating provided on the surface of an article by the sunlight, the surface of the photocatalytic coating is highly hydrophilized during exposure to the sunlight in the daytime, the hydrophilicity lowers but is retained on a certain satisfactory level in the nighttime, and when the sun is up again, the hydrophilicity is recovered. Thus, the surface of the article retains a high level of hydrophilicity.

Therefore, when the photocatalytic coating is provided on articles, such as windowpanes for buildings, windowpanes and windshields for vehicles and vessels, mirrors, lenses, shields of goggles and helmets, or cover glasses for measuring instruments, condensation of moisture or steam in air does not result in the formation of light scattering fog on the surface of these articles, because the condensed water spreads into an even film without forming discrete water droplets.

Likewise, exposure of windowpanes, rearview mirrors for vehicles, windshields for vehicles, eyeglass lenses, and shields of helmets to rainfall or a spray of water does not result in the formation of discrete water droplets which obstruct the view, because water droplets adhered on the surface of these articles rapidly spread into an even water film.

This permits a high level of view and visibility to be ensured, which in turn ensures traffic safety for vehicles and improves the efficiency of various works and activities.

When the photocatalytic coating is provided on machinery and articles which are disposed outdoors, the photocatalyst is photoexcited during exposure to the sunlight in the daytime, rendering the surface of the photocatalytic coating hydrophilic. These machinery and articles are sometimes exposed to rainfall. In this case, since the hydrophilified surface gets intimate with water rather than hydrophobic dust and contaminants, the hydrophobic dust and contaminants deposited on the surface of the machinery and articles are separated from this surface upon contact of the surface with water. Therefore, every time when the hydrophilified surface is exposed to rainfall, the dust and contaminants deposited on the surface are washed away by raindrops, permitting the surface to be selfcleaned. Further, lipophilic dust is less likely to adhere onto the surface of the hydrophilic photocatalytic coating.

Provision of a photocatalytic coating on machinery and parts, tableware, kitchen utensils or other articles which are likely to be stained with an oil, results in improved oil repellency of the surface of these articles in water by virtue of photocatalytic action. Therefore, when these articles with the photocatalytic coating, stained with an oil or fat are immersed in or wetted or rinsed with water, the surface of the photocatalytic coating repels the oil and fat, permitting the oil and fat to be released and easily removed from the surface of the articles. Thus, articles stained with an oil or fat can be cleaned without use of any detergent.

EXAMPLES

The present invention will be described from various viewpoints with reference to the following examples.

Example 1

Hydrophilification by Photocatalytic Action

Tetraethoxysilane $Si(OC_2H_5)_4$ (manufactured by Wako Pure Chemical Industries, Ltd., Osaka) (6 parts by weight), 6 parts by weight of pure water, and 2 parts by weight of 36% hydrochloric acid as a tetraethoxysilane hydrolysis rate modifier were added to and mixed with 86 parts by weight of ethanol as a solvent to prepare a silica coating solution.

Since the mixing was exothermic, the mixed solution was allowed to stand for about one hr, thereby cooling the solution. The solution was flow-coated on the surface of a 10-cm square soda-lime glass plate, and the coating was dried at a temperature of 80° C. The drying first caused hydrolysis of tetraethoxysilane to give silanol $Si(OH)_4$ which then underwent dehydration polycondensation to form a thin film of amorphous silica on the surface of the glass plate.

Then, 0.1 part by weight of 36% hydrochloric acid as a hydrolysis rate modifier was added to a mixture of 1 part by weight of tetraethoxytitanium $Ti(OC_2H_5)_4$ (manufactured by Merck) with 9 parts by weight of ethanol to prepare a titania coating solution which was then flow-coated on the above glass plate in dry air. The coverage of the solution was 45 $\mu g/cm^2$ in terms of titania. Due to very high hydrolysis rate of tetraethoxysilane, part of tetraethoxytitanium was hydrolyzed in the stage of coating, initiating the formation of titanium hydroxide $Ti(OH)_4$.

The glass plate was held for 1 to 10 min at about 150° C. to complete the hydrolysis of tetraethoxytitanium and, at the same time, to conduct dehydration polycondensation of the resultant titanium hydroxide, thereby giving amorphous titania. Thus, a glass plate bearing a base coat, of amorphous silica, having thereon a top coat of amorphous titania was prepared as a sample.

The sample was fired at 500° C. to transform the amorphous titania into the anatase form of titania to prepare sample #1.

The sample #1 was allowed to stand for several days in a dark place, and the surface of the sample #1 was then irradiated with ultraviolet light using a 20-W black light blue (BLB) fluorescent lamp (FL20BLB, manufactured by Sankyo Denki) at an irradiation intensity of 0.5 $mW/cm^2$ (in terms of the irradiation intensity of ultraviolet light having higher energy than band gap energy of the anatase form of titania, i.e., ultraviolet light at wavelengths shorter than 387 nm) for about one hr, thereby preparing a sample #2.

For comparison, a glass plate not coated with silica and titania was allowed to stand in a dark place for several days and then used as a sample #3.

The contact angle of the sample #2 and the sample #3 with water was measured with a contact angle goniometer (Model CA-X150, manufactured by Kyowa Interface Science Co., Ltd., Asaka-shi, Saitama-ken). The detection limit on the low-angle side of the contact angle goniometer was 1°. The contact angle was measured 30 sec after dropping a water droplet through a microsyringe on the surface of the sample. This measuring method was used also in the following examples. The goniometer reading of the contact angle of the surface of the sample #2 with water was 0°, indicating that the surface of this sample was superhydrophilic. By contrast, the contact angle of the sample #3 with water was 30 to 40°.

This suggests that the surface of the titania coating has been highly hydrophilified by the photocatalytic action of titania.

Likewise, the surface of a soda-lime glass plate was coated with a thin film of amorphous titania, and the coated glass plate was fired at 500° C. to transform the amorphous titania into the anatase form of titania, thereby preparing a sample #4. The sample #4 was placed in a desiccator (temperature 24° C., humidity 45–50%) and irradiated with ultraviolet light at an irradiation intensity of 0.5 $mW/cm^2$ until the contact angle of this sample with water became 3°.

The sample #4 was then allowed to stand in a dark place and taken out of the dark place at different time intervals. In this case, each time when the sample was taken out of the dark place, the contact angle of the sample with water was measured. A change in contact angle with the elapse of time is tabulated in the following Table

TABLE 1

| Sample | Contact angle with water (°) |
|---|---|
| Sample #4 (immediately after irradiation) | 3.0 |
| Sample #4 (after 3 hr) | 5.0 |
| Sample #4 (after 6 hr) | 7.7 |
| Sample #4 (after 8 hr) | 8.2 |
| Sample #4 (after 24 hr) | 17.8 |
| Sample #4 (after 48 hr) | 21.0 |
| Sample #4 (after 72 hr) | 27.9 |

As shown in Table 1, interruption of the photoexcitation of the photocatalyst causes the hydrophilicity of the sample to attenuate with the elapse of time. This is probably because the surface of the photocatalytic coating is contaminated with a hydrophobic material.

Example 2

Influence of Excitation Wavelength

A titania (anatase form) sol (STS-11, manufactured by Ishihara Sangyo Kaisha Ltd., Osaka) was spray-coated on the surface of a 15-cm square glazed tile (AB02E01, manufactured by TOTO, LTD.), and the coating was fired for 10 min at 800° C. to prepare a sample #1. This sample and a comparative glazed title not coated with the titania were allowed to stand in a dark place for 10 days, and the sample and the comparative sample were irradiated with monochromatic ultraviolet light using an Hg—Xe lamp under conditions specified in the following Table 2, and a change in contact angle with water as a function of the irradiation time was determined.

TABLE 2

| Wavelength of UV light (nm) | Irradiation intensity of UV light (mW/cm$^2$) | Density of photon (photon/sec/cm$^2$) |
|---|---|---|
| 313 | 10.6 | $1.66 \times 10^{16}$ |
| 365 | 18 | $3.31 \times 10^{16}$ |
| 405 | 6 | $1.22 \times 10^{16}$ |

Figure 1B:
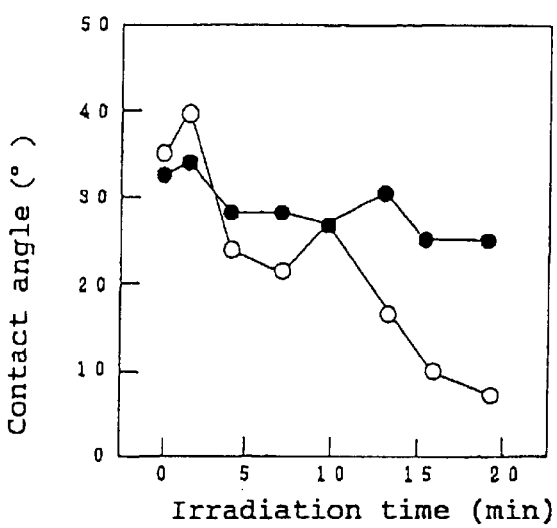
Figure 1C:
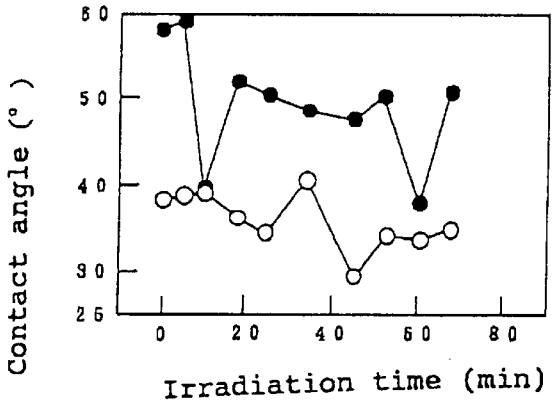

The results are shown as graphs in FIGS. 1A to 1C. In these graphs, values plotted by open circles represent the contact angle of the sample #1 with water, and values plotted by closed circles represent the contact angle of the glazed tile not coated with titania.

As can be seen from the graph shown in FIG. 1C, the irradiation of the sample with ultraviolet light having lower energy than that at a wavelength of 387 nm corresponding to the band gap energy of the anatase form of titania (i.e., ultraviolet light having a longer wavelength than 387 nm) results in no hydrophilification.

On the other hand, as shown in graphs of FIGS. 1A and 1B, in the case of irradiation of the sample with ultraviolet light having higher energy than the band gap energy of the anatase form of titania, the surface of the sample is hydrophilified in response to the ultraviolet light irradiation.

From the above results, it has been confirmed that the hydrophilification of the surface does not occur without the photoexcitation of the semiconductor photocatalyst and is attributable to the photocatalytic action.

The reason why the contact angle of the sample, in this example, with water did not reach 0° is considered to reside in that, unlike the sample of Example 1, the sample of this example has no silica layer interposed between the glass substrate and the titania layer, causing an alkaline network-modifier ion, such as sodium ion, to be diffused from the glaze into the titania coating during firing at 800° C., which inhibits the photocatalytic activity of the anatase.

Example 3

Physical Adsorption of Water by Photocatalytic Action

A titania (anatase form) powder (P-25, manufactured by Nippon Aerosil Co., Ltd.) was pressed to prepare three disk samples. These samples were subjected to the following tests 1 to 3, and the surface of each of the samples was analyzed by Fourier transform infrared spectroscopy (FT-IR) using a Fourier transform infrared spectrometer (FTS-40A). In each test, an ultraviolet lamp (UVL-21) at a wavelength of 366 nm was used for ultraviolet irradiation.

In the analysis of the infrared absorption spectrum, absorption bands provide the following information.

Sharp absorption band at wavenumber 3690 cm$^{-1}$: stretching of OH bond in chemically adsorbed water Broad absorption band at wavenumber 3300 cm$^{-1}$: stretching of OH bond in physically adsorbed water Sharp absorption band at wavenumber 1640 cm$^{-1}$: bending of HOH bond in physically adsorbed water Absorption bands at wavenumbers 1700 cm$^{-1}$, 1547 cm$^{-1}$, 1475 cm$^{-1}$, 1440 cm$^{-1}$, and 1365 cm$^{-1}$: a carboxylate complex produced by the adsorption of a contaminant onto the surface of the sample Test 1

Figure 2A:
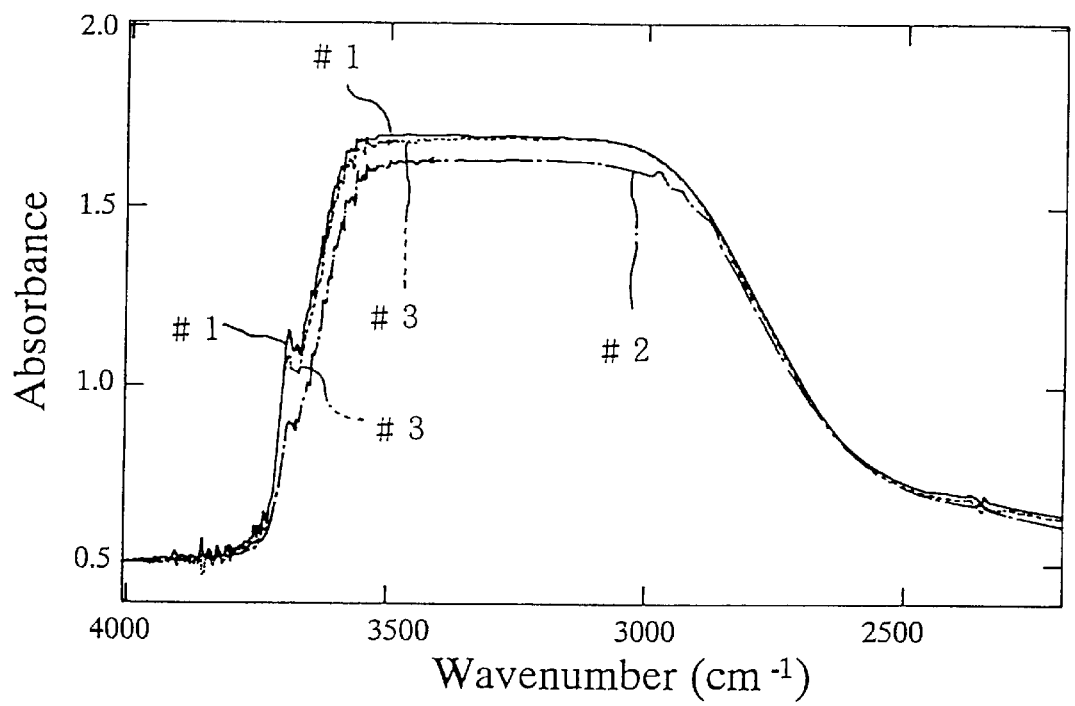
FIGS. 2A and 2B, FIGS. 3A and 3B, FIGS. 4A and 4B, FIGS. 5A and 5B, and FIGS. 6A and 6B are each an infrared absorption spectrum of the surface of a photocatalytic coating.
Figure 2B:
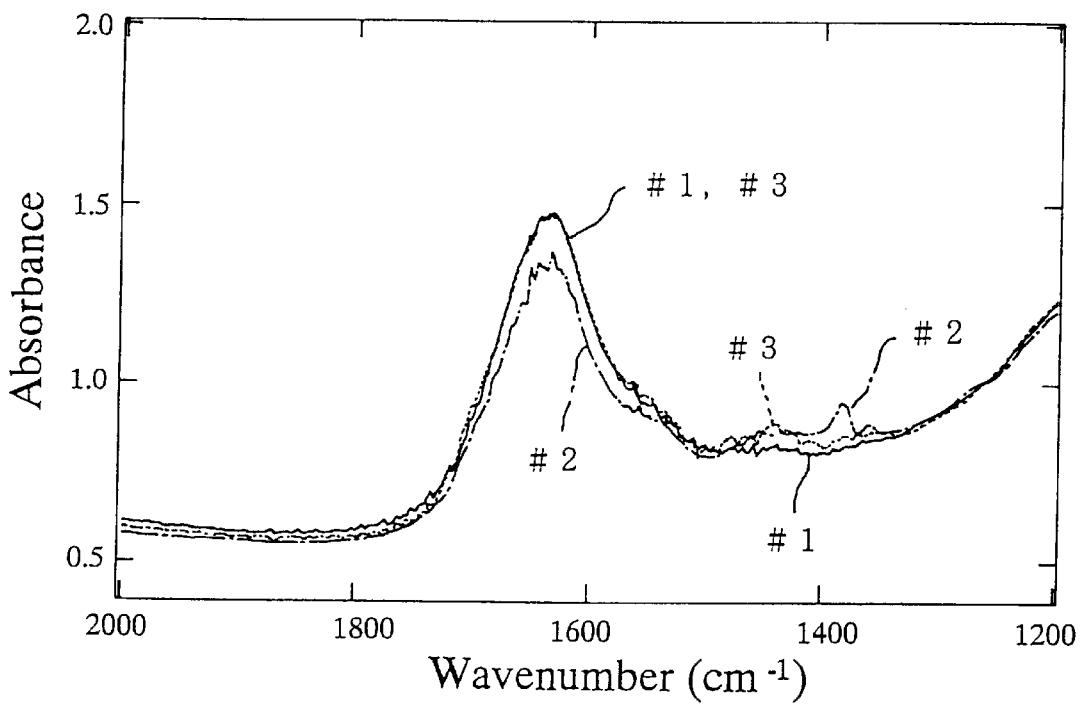

At the outset, the titania disk immediately after pressing was analyzed by infrared spectroscopy. An absorption spectrum for the disk immediately after pressing is shown as a curve #1 in FIGS. 2A and 2B.

The titania disk was stored for 17 hr in a dry box containing silica gel as a desiccant, stored for 17 hr, and analyzed by infrared spectroscopy to provide an infrared absorption spectrum. The absorption spectrum thus obtained is shown as a curve #2 in FIGS. 2A and 2B. Comparison of the spectrum #1 with the spectrum #2 shows that, for the spectrum #2, a dramatic reduction in absorption is observed at wavenumber 3690 cm$^{-1}$, indicating reduced chemically adsorbed water. Further, for the spectrum #2, a dramatic reduction in absorption is observed also at wavenumbers 3300 cm$^{-1}$ and 1640 cm$^{-1}$, indicating that the physically adsorbed water as well has been reduced. Thus, it is apparent that storage in dry air for 17 hr resulted in a reduction in both chemically adsorbed water and physically adsorbed water. When the above procedure is repeated except for the use of the anatase form of titania as a thin film instead of the pressed disk, an increase in contact angle of the sample with water is observed.

On the other hand, an increase in absorption at wavenumbers 1300 to 1700 cm$^{-1}$ attributable to a carboxylate complex is observed, suggesting that the above substance was adsorbed on and contaminated the surface of the sample during storage of the sample.

Then, the titania disk was placed in the dry box and irradiated with ultraviolet light at an irradiation intensity of about 0.5 mW/cm$^2$ for about one hr, followed by infrared spectroscopic analysis to provide an infrared absorption spectrum. The absorption spectrum thus obtained is shown as a curve #3 in FIGS. 2A and 2B.

As can be seen from the spectrum #3, the absorption at wavenumber 3690 cm$^{-1}$ returned to substantially the same level of absorption as observed in the initial state. Further, the absorption at wavenumbers 3300 cm$^{-1}$ and 1640 cm$^{-1}$ also returned to the same level of absorption as observed in the initial state. These results show that ultraviolet irradiation brings both the amount of the chemically adsorbed water and the amount of the physically adsorbed water to those observed in the original state.

As can be expected from the results of Example 1, it is considered that, when the above procedure is repeated except for the use of a thin film instead of the pressed disk, the surface of the thin film is hydrophilified to decrease the contact angle of the thin film with water.

Figure 3A:
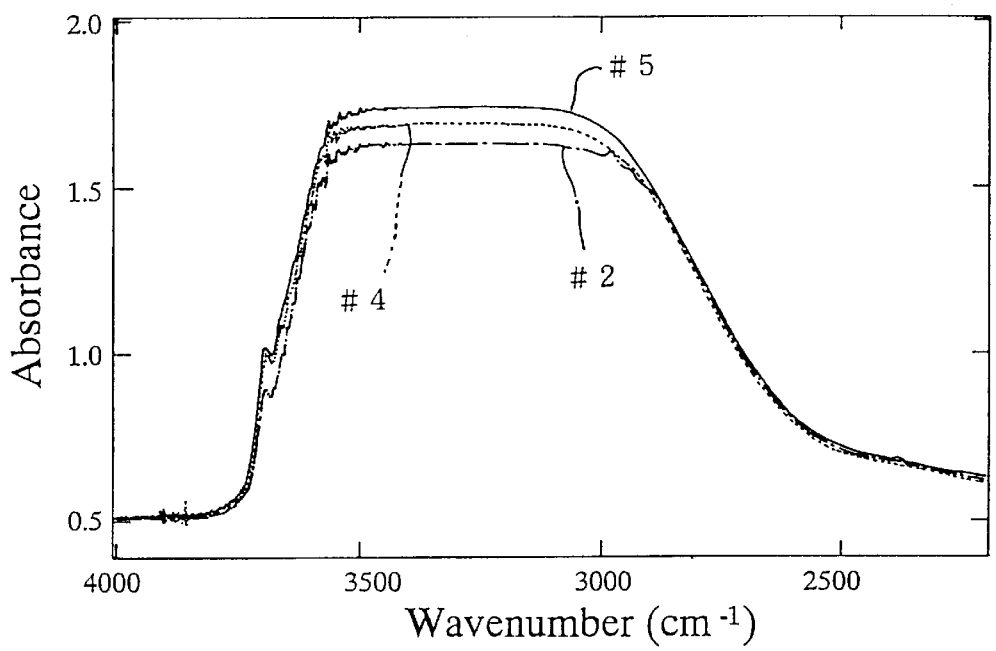
Figure 3B:
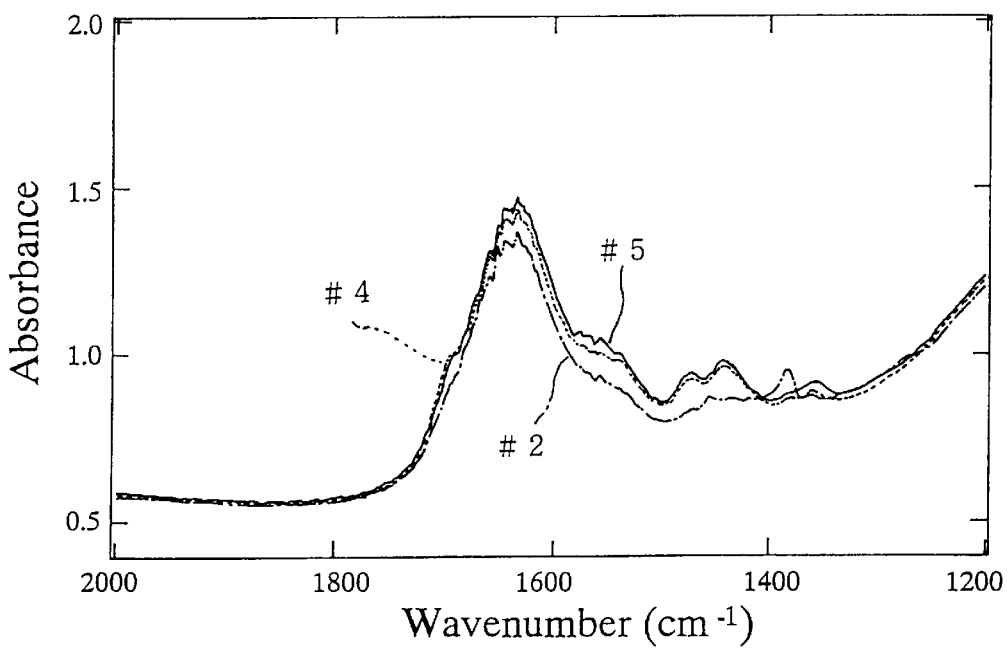

Thereafter, the sample was stored for 24 hr in a dark room communicating with the air and then analyzed by infrared spectroscopy to provide an infrared absorption spectrum. In order to avoid excessive complication of the diagram, the absorption spectrum thus obtained is shown as a curve #4 in FIGS. 3A and 3B, separately from FIGS. 2A and 2B. For comparison convenience, the spectrum #2 is reproduced in the graph of FIGS. 3A and 3B. As can be seen from the spectrum #4, only a slight reduction in absorption is observed at wavenumbers 3690 cm$^{-1}$ and 1640 cm$^{-1}$. This demonstrates that storage of the sample, after ultraviolet irradiation, in a dark room in the presence of moisture in the air results in slight reduction in chemically adsorbed water and physically adsorbed water. However, an increase in absorption is observed at wavenumbers 1300 cm$^{-1}$ and 1700 cm$^{-1}$, indicating further adherence of the carboxylate complex on the disk. When the above procedure is repeated except for use of a thin film instead of the pressed disk, an increase in contact angle of the thin film with water is observed.

Finally, the titania disk was again irradiated with ultraviolet light in the dark room communicating with the air at an irradiation intensity of 0.5 mW/cm$^2$ for about one hr and then analyzed by infrared spectroscopy. The absorption spectrum thus obtained is shown as a curve #5 in FIGS. 3A and 3B. As can be seen from the graph, no change is observed in absorption at wavenumber 3690 cm$^{-1}$, whereas the absorption at wavenumber 3300 cm$^{-1}$ was markedly increased with the absorption at wavenumber 1640 cm$^{-1}$ being increased. These results show that re-irradiation of the sample with ultraviolet light resulted in an increase in the amount of the physically adsorbed water with the amount of the chemically adsorbed water remaining unchanged. The amount of the carboxylate complex (contaminant) remained unchanged, indicating that the carboxylate complex was not removed by ultraviolet irradiation. When the above procedure is repeated except for use of a thin film instead of the pressed disk, a decrease in contact angle of the thin film with water is observed.

Test 2

Figure 4A:
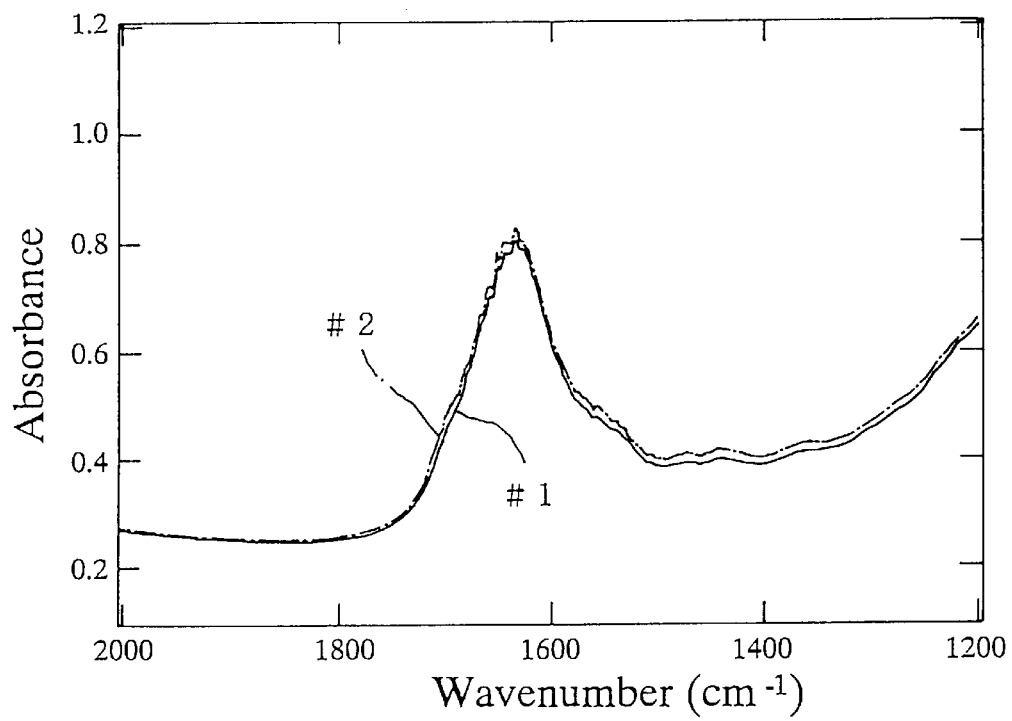
Figure 4B:
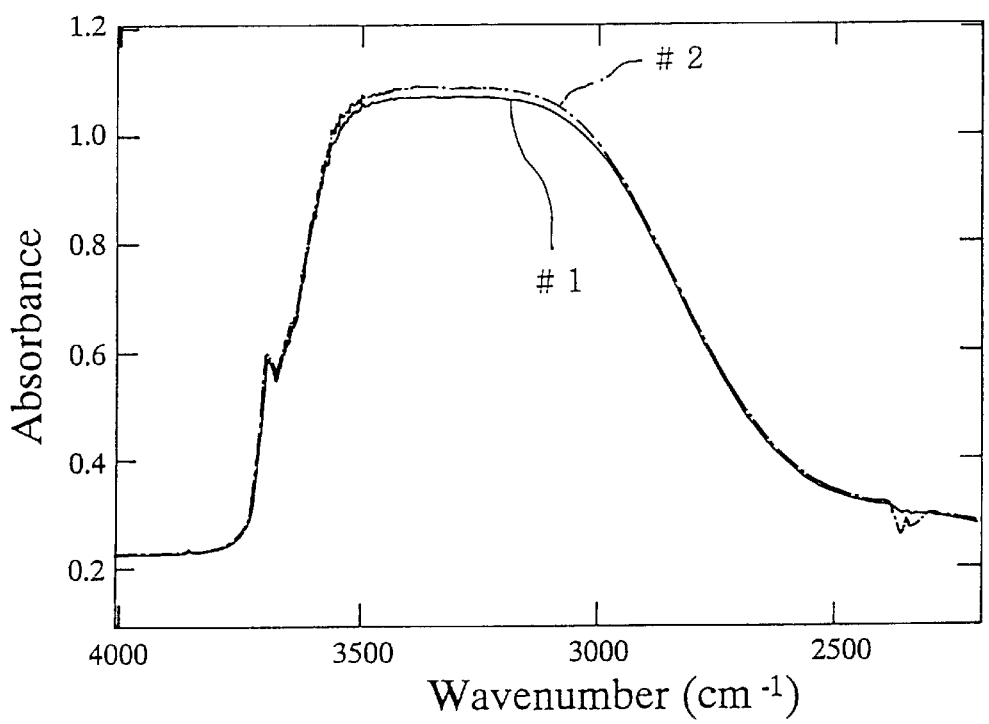
Figure 5A:
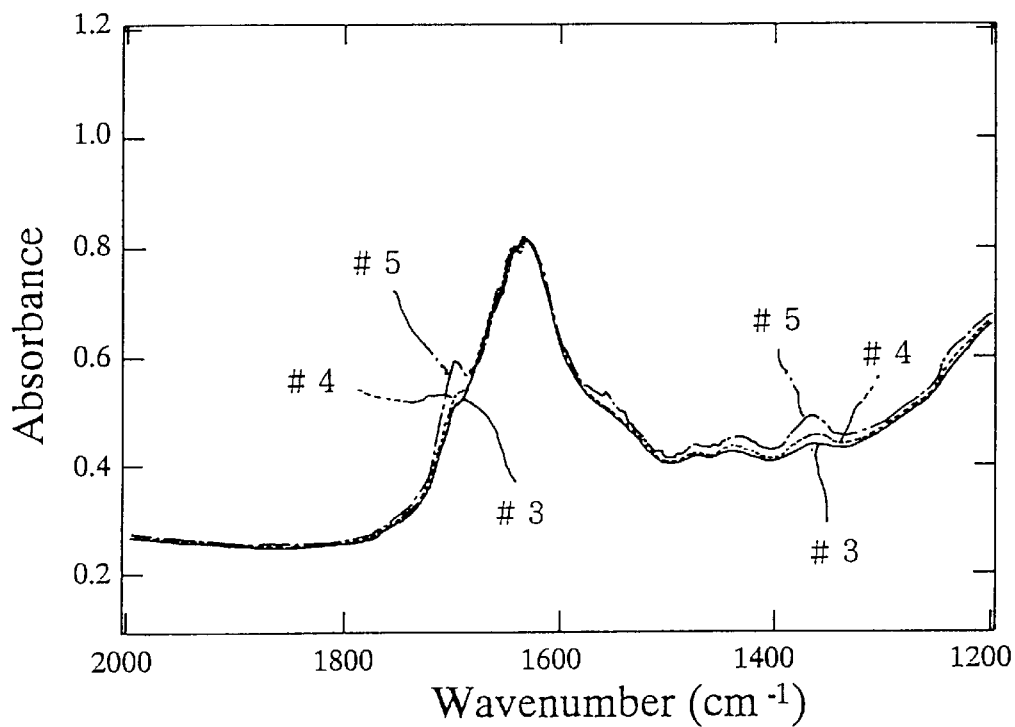
Figure 5B:
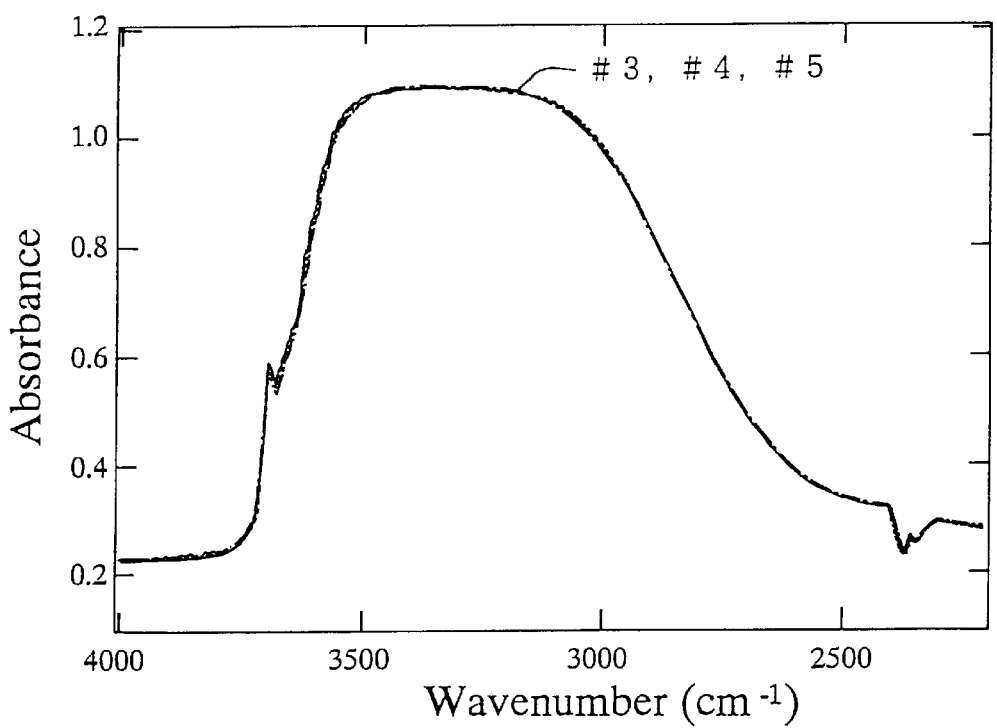

At the outset, the titania disk immediately after pressing was analyzed by infrared spectroscopy to provide an infrared absorption spectrum (a spectrum #1 in a graph shown in FIGS. 4A and 4B). Thereafter, the disk was irradiated with ultraviolet light for one hr at an irradiation intensity of about 0.5 mW/cm$^2$ and then analyzed by infrared spectroscopy to provide an infrared absorption spectrum (a spectrum #2 in FIGS. 4A and 4B). The disk was further irradiated with ultraviolet light at the same irradiation intensity for additional one hr (2 hr in total), further additional one hr (3 hr in total), and further additional two hr (5 hr in total) and then analyzed by infrared spectroscopy to provide infrared absorption spectra (spectra #3, #4, and #5 in FIGS. 5A and 5B).

Comparison of the spectrum #1 with the spectrum #2 shows that the first ultraviolet irradiation caused an increase in both the amount of chemically adsorbed water and the amount of physically adsorbed water. During the ultraviolet irradiation, the amount of a carboxylate complex adhered onto the sample was slightly increased. When the above procedure is repeated except for use of a thin film instead of the pressed disk, the contact angle of the thin film with water is decreased upon ultraviolet irradiation.

Ultraviolet irradiation for additional one hr (2 hr in total) resulted in a slight decrease in amount of the chemically adsorbed water with the amount of the physically adsorbed water remaining unchanged (compare the spectrum #2 with the spectrum #3). The amount of the carboxylate complex was slightly increased. No change in the amount of the physically adsorbed water is considered to be attributable to the saturation of the amount of the physically adsorbed water. It is considered that when the above procedure is repeated except for use of a thin film instead of the pressed disk, the contact angle of the thin film with water remains unchanged.

Ultraviolet irradiation for further additional one hr (3 hr in total) and for further additional 2 hr (5 hr in total) resulted in a further decrease in amount of the chemically adsorbed water with the amount of the physically adsorbed water remaining unchanged (see spectra #4 and #5). The amount of the carboxylate adhered onto the sample was increased. It is considered that when the above procedure is repeated except for use of thin film instead of the pressed disk, the contact angle of the thin film with water remains unchanged.

Test 3

This test is similar to the test 1. A major difference between the test 1 and the test 3 was to decrease the irradiation intensity of ultraviolet light.

Figure 6A:
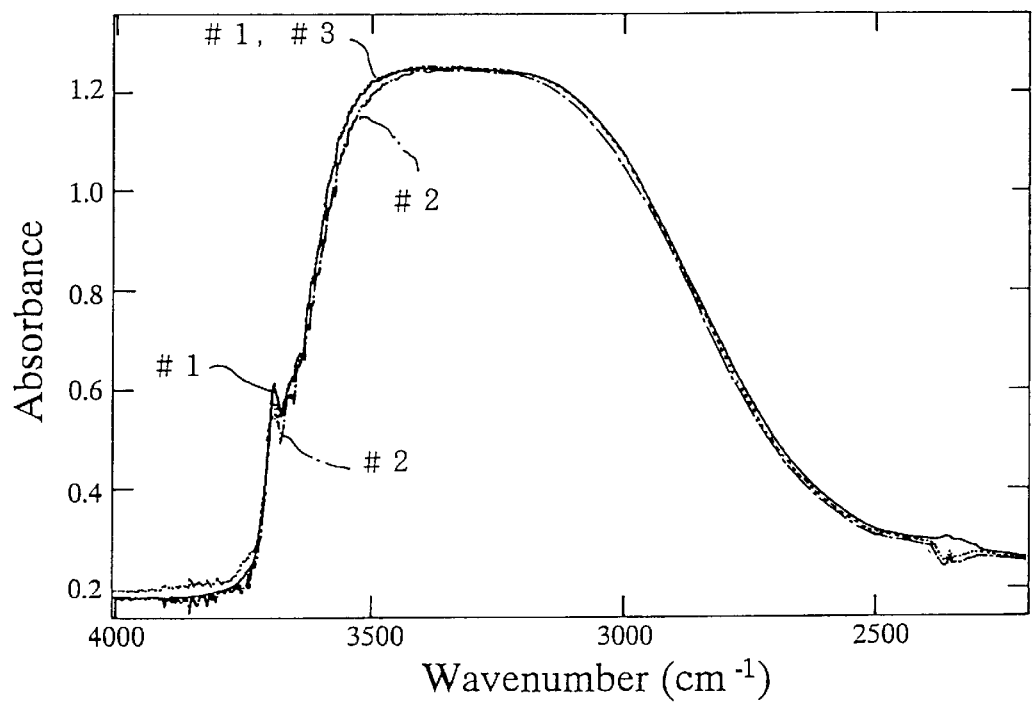
Figure 6B:
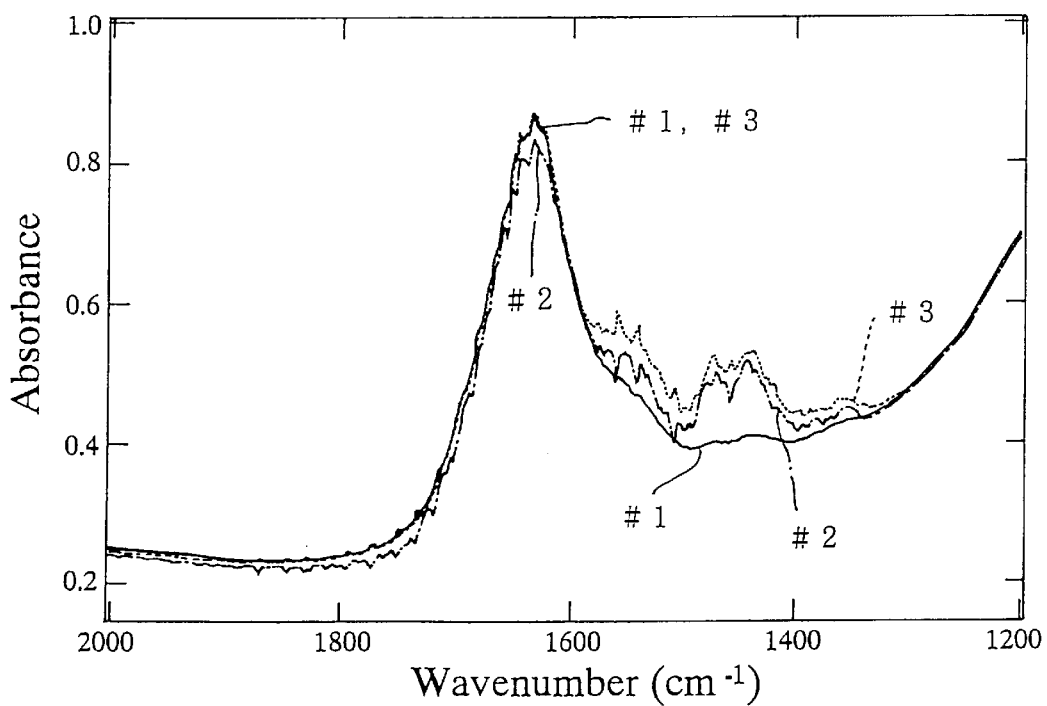

At the outset, the titania disk immediately after pressing was analyzed by infrared spectroscopy to provide an infrared absorption spectrum (a spectrum #1 in FIGS. 6A and 6B). Thereafter, it was stored for 34 hr in a dark room communicating with the air and then analyzed by infrared spectroscopy to provide an infrared absorption spectrum (a spectrum #2 in FIGS. 6A and 6B). The titania disk was then irradiated, in the same dark room, with ultraviolet light at an irradiation intensity of 0.024 mW/cm$^2$ for about 2 hr, followed by infrared spectroscopic analysis to provide an infrared absorption spectrum (a spectrum #3 in FIGS. 6A and 6B).

As can be seen from the graph, standing of the disk in a dark room in the presence of moisture in the air results in a decrease in both the amount of the chemically adsorbed water and the amount of the physically adsorbed water. An increase in amount of the carboxylate complex adhered onto the disk was observed. It is considered that, when the above procedure is repeated except for use of a thin film instead of the pressed disk, the contact angle of the thin film with water is increased.

The amount of the chemically adsorbed water slightly increased in response to ultraviolet irradiation, and the ultraviolet irradiation brought the amount of the physically adsorbed water to the same level of absorption as observed in the initial state. During the ultraviolet irradiation, the amount of the carboxylate complex adhered onto the disk slightly increased. It is considered that, when the above procedure is repeated except for use of a thin film instead of the pressed disk, the contact angle of the thin film with water is increased.

Evaluation

The test results are summarized in the following Table 3.

pure water, and 2 parts by weight of 36% hydrochloric acid as a tetraethoxysilane hydrolysis rate modifier were added to

TABLE 3

| Test | Contact angle with water | Chemically adsorbed water | Physically adsorbed water | Adsorbed carboxylate complex |
|---|---|---|---|---|
| Test 1 (0.5 mW/cm$^2$) | | | | |
| -Stored in dark place (in dry air) | Increased | Decreased | Decreased | Increased |
| -Ultraviolet irradiation (in dry air) | Decreased | Substantially recovered | Returned to the initial level | Decreased |
| -Stored in dark place (in the atmosphere) | Increased | Slightly decreased | Slightly decreased | Increased |
| -Ultraviolet irradiation (in the atmosphere) | Decreased | Unchanged | Increased | unchanged |
| Test 2 (0.5 mW/cm$^2$) | | | | |
| -Ultraviolet irradiation (1 hr) | Decreased | Slightly increased | Increased | Slightly increased |
| -Ultraviolet irradiation (2 hr) | Unchanged | Slightly decreased | Unchanged | Slightly increased |
| -Ultraviolet irradiation (3 hr) | Unchanged | Slightly decreased | Unchanged | Increased |
| -Ultraviolet irradiation (5 hr) | Unchanged | Slightly decreased | Unchanged | Increased |
| Test 3 (0.024 mW/cm$^2$) | | | | |
| -Stored in dark place (in the atmosphere) | Increase | Decreased | Decreased | Increased |
| -Ultraviolet irradiation (in the atmosphere) | Decreased | Slightly increased | Increased | Increased |

As can be fully understood from Table 3, the amount of the physically adsorbed water increases in good response to the ultraviolet irradiation.

Figure 7:
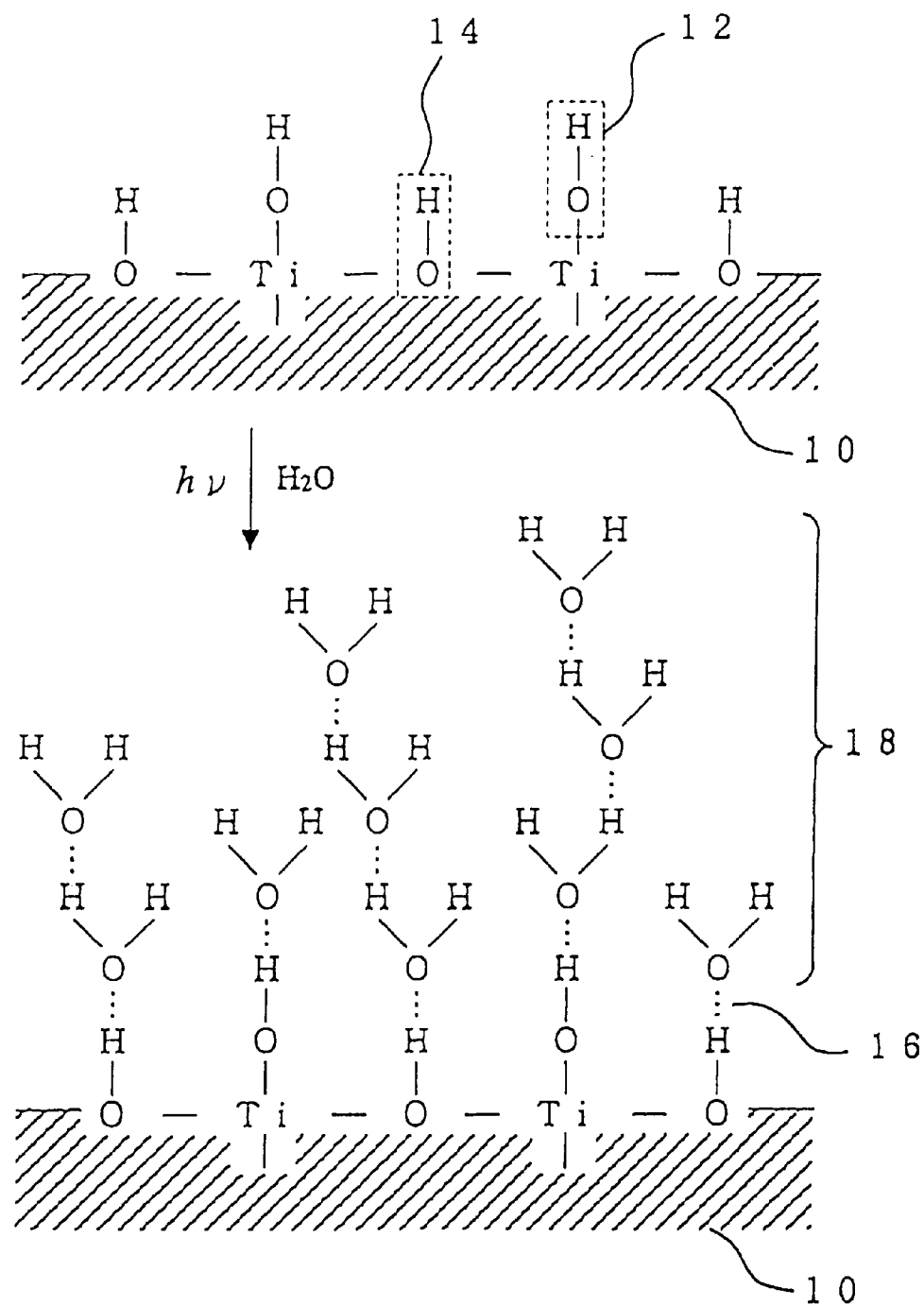
FIG. 7 is a microscopically enlarged, schematic cross-sectional view, of a solid/gas interface of a photocatalytic coating, illustrating the physical adsorption of molecules of water on the surface of the photocatalytic coating by photocatalytic action.

In this connection, it is considered that, as shown in the upper part of FIG. 7, in the crystal face of a titania crystal in a titania coating 10, a terminal OH group 12 is bonded to one titanium atom, a bridge OH group 14 is bonded to adjacent two titanium atoms, and these OH groups constitute a layer of chemically adsorbed water. As shown in the lower part of FIG. 7, ultraviolet irradiation in the presence of moisture in the air results in the physical adsorption of molecules of water onto the hydrogen atom in the terminal OH group and the bridge OH group through a hydrogen bond to form a layer 18 of physically adsorbed water.

As described above, the amount of the physically adsorbed water increases in good response to the ultraviolet irradiation, and, hence, this example demonstrates that the formation of the physically adsorbed water layer 16 is induced by the photocatalytic action of titania. It is understood that the presence of the physically adsorbed water layer 16 results in improved hydrophilicity of the surface of titania.

On the other hand, the amount of the carboxylate complex adhered onto the surface of the sample appears to increase with increasing the time of contact with the air. It is considered that photoexcitation of the photocatalyst would result in improved hydrophilicity of the surface of the sample despite the increased amount of the carboxylate complex adhered onto the sample.

Example 4

Surface Energy and Hydrophilicity

Tetraethoxysilane (manufactured by Wako Pure Chemical Industries, Ltd.) (6 parts by weight), 6 parts by weight of pure water, and 2 parts by weight of 36% hydrochloric acid as a tetraethoxysilane hydrolysis rate modifier were added to and mixed with 86 parts by weight of ethanol as a solvent to prepare a silica coating solution. The mixed solution was allowed to stand for about one hr and then flow-coated on the surface of a soda-lime glass to prepare two glass plates coated with an amorphous silica base coat.

Then, 0.1 part by weight of 36% hydrochloric acid as a hydrolysis rate modifier was added to a mixture of 1 part by weight of tetraethoxytitanium (manufactured by Merck) with 9 parts by weight of ethanol to prepare a titania coating solution which was then flow-coated on the surface of the above glass plates in dry air. The coverage of the solution was 45 μg/cm$^2$ in terms of titania.

Thereafter, the glass plates were held for 1 to 10 min at about 150° C. in dry air to prepare two glass plates coated with a top coat of amorphous titania.

Further, these glass plates were fired respectively at 440° C. and 550° C. to transform the amorphous titania into the anatase form of titania, thereby preparing a sample #1 and a sample #2.

The contact angle of the surface of these samples with water was measured. Further, formamide, β-thiodiglycol, ethylene glycol, α-bromonaphthalene, hexachlorobutadiene, and methylene iodide were selected as liquids with known components of the surface energy, and the contact angle of the surface of the samples with these liquids was measured.

The surface of the samples was then irradiated with ultraviolet light using a black light blue fluorescent lamp (FL20BLB) at an irradiation intensity of 0.5 mW/cm$^2$ for about one hr. Thereafter, the contact angle of the surface of the samples with water, formamide, β-thiodiglycol, ethylene glycol, α-bromonaphthalene, hexachlorobutadiene, and methylene iodide was measured again.

The results of the contact angle measurement before and after the ultraviolet irradiation are tabulated in the following Table 4. It is particularly noteworthy that the sample #1 was highly hydrophilified to give a contact angle thereof with water of 0°.

and $\gamma_S^h$, for a certain solid S can be determined from the equation (5) by the method of least squares.

For the surface energy of water, formamide, β-thiodiglycol, ethylene glycol, α-bromonaphthalene, hexachlorobutadiene, and methylene iodide, three

TABLE 4

| Sample | Water | Formamide | Thiodiglycol | Ethylene glycol | Bromo-naphthalene | Chloro-butadiene | Methylene iodide |
|---|---|---|---|---|---|---|---|
| #1 (before irradiation) | 52 | 38 | 60 | 49 | 28 | 12 | 29 |
| #1 (after irradiation | 0 | 9.5 | 12 | 3 | 9 | 0 | 36 |
| #2 (before irradiation | 63 | 48 | 45 | 50 | 25.5 | 8 | 38 |
| #2 (after irradiation | 13 | 13.5 | 14 | 5 | 16 | 0 | 33 |

Based on the contact angles thus measured, the surface free energy of the titania coating was determined by the following method.

It is known that the following Young's equation (1) is established for the contact angle, θ, that, when a liquid droplet is put on the surface of a solid, the droplet makes with the solid surface:

$$\gamma_L \cdot \cos\theta = \gamma_S - \gamma_{SL} \quad (1)$$

wherein $\gamma_S$ represents the Gibbs free energy in the interface of the solid and the gas, $\gamma_L$ represents the Gibbs free energy in the interface of the liquid and the gas, and $\gamma_{SL}$ represents the Gibbs free energy in the interface of the solid and the liquid.

The Gibbs free energy released upon contact between the liquid and the solid is called the "work of adhesion" ($W_{SL}$) and given by the following Dupre's equation (2):

$$W_{SL} = \gamma_S + \gamma_L - \gamma_{SL} \quad (2)$$

Further, according to the extended Fowkes' equation established by Hata and Kitazaki (Journal of The Adhesion Society of Japan 8, 131, 1972), $\gamma_{SL}$ is given by the following equation:

$$\gamma_{SL} = \gamma_S + \gamma_L - 2\sqrt{\gamma_S^d \gamma_L^d} - 2\sqrt{\gamma_S^P \gamma_L^P} - 2\sqrt{\gamma_S^h \gamma_L^h} \quad (3)$$

wherein superscript d represents the molecular dispersion force of the surface energy, superscript p represents the dipole moment component of the surface energy and superscript h represents the hydrogen bond component of the surface energy.

From the equations (1) and (2), $$W_{SL} = (1+\cos\theta) \cdot \gamma_L \quad (4)$$

From the equations (3) and (4), $$\sqrt{\gamma_S^d} \cdot \sqrt{\gamma_L^d} + \sqrt{\gamma_S^P} \cdot \sqrt{\gamma_L^P} + \sqrt{\gamma_S^h} \cdot \sqrt{\gamma_L^h} = \frac{(1+\cos\theta)\gamma_L}{2} \quad (5)$$

In a liquid L, when the molecular dispersion force $\gamma_L^d$, the dipole moment component $\gamma_L^P$, and the hydrogen bond component $\gamma_L^h$ in the surface energy are known and when the d P contact angle θ is known, three parameters, $\gamma_S^d$, $\gamma_S^P$, components, $\gamma_L^d$, $\gamma_L^P$, and $\gamma_L^h$, are known to be as given in the following Table 5 (Yuji Harada, "WAKARIYASUI COATING GIJUTSU", RIKO SHUPPAN, p.93)

TABLE 5

| Liquid | $\gamma_L$ | $\gamma_L^d$ | $\gamma_L^P$ | $\gamma_L^h$ |
|---|---|---|---|---|
| Water | 72.8 | 29.1 | 1.3 | 42.4 |
| Formamide | 58.2 | 35.1 | 1.6 | 21.5 |
| β-Thioglycol | 54.0 | 39.2 | 1.4 | 13.4 |
| Ethylene glycol | 47.7 | 30.1 | 0 | 17.6 |
| α-Bromonaphthalene | 44.6 | 44.4 | 0.2 | 0 |
| Hexachlorobutadiene | 36.0 | 35.8 | 0.2 | 0 |
| Methylene iodide | 50.8 | 46.8 | 4.0 | 0 |

(erg/cm²)

The measured values of the contact angle θ given in d P Table 4 and the known three components, $\gamma_L^d$, $\gamma_L^P$, and $\gamma_L^h$, of the surface energy of various liquids given in Table 5 were inserted into the equation (5), and each of the components, $\gamma_S^d$, $\gamma_S^P$, and $\gamma_S^h$, of the surface energy in the titania coating was calculated by the method of least squares. The results are summarized in Table 6.

TABLE 6

| | Surface free energy (erg/cm²) | | | |
|---|---|---|---|---|
| Sample | $\gamma_S^d$ | $\gamma_S^P$ | $\gamma_S^h$ | $\gamma_S$ |
| #1 (before UV irradiation) | 29.14 | 25.21 | 8.01 | 62.36 |
| #1 (after UV irradiation) | 31.81 | 16.46 | 23.26 | 71.53 |
| #2 (before UV irradiation) | 32.60 | 12.46 | 5.51 | 50.56 |
| #2 (after UV irradiation) | 31.61 | 18.51 | 22.11 | 72.23 |

As can be seen from Table 6, it has been found that for both the sample #1 and the sample #2, the ultraviolet irradiation results in markedly increased hydrogen bond component $\gamma_S^h$ in the surface energy. On the other hand, no clear change is observed in the molecular dispersion force component $\gamma_S^d$ and the dipole moment component $\gamma_S^P$ in the surface energy.

From the above results, it is considered that the photocatalytic action caused by the photoexcitation of the photocatalyst enhances the hydrogen bond component $\gamma_S^h$ in the surface energy of the photocatalytic coating, accelerating the physical adsorption of molecules of water, which results in increased amount of the physically adsorbed water to highly hydrophilify the surface of the coating.

Example 5

Oil Repellency in Water

This example demonstrates that the oil repellency of the surface of a photocatalytic coating in water improves with increasing the hydrogen bond component $\gamma_S^h$ in the surface energy.

The oil repellency in water of the surface of the sample #1 and the sample #2 prepared in Example 4 was observed before and after the ultraviolet irradiation. For this purpose, according to a conventional method, methylene iodide was selected as a liquid representative of an oil. Before and after the ultraviolet irradiation, methylene iodide was dropped on the surface of the sample #1 and the sample #2, and the samples were then immersed, while keeping the surface horizontal, into water contained in a water tank.

As a result, in the sample #1 and the sample #2 before the ultraviolet irradiation, methylene iodide remained adhered in a lens form in the interface of the photocatalytic coating and water. This state was photographed from the side, and the contact angle of the surface of the photocatalytic coating with methylene iodide in water was measured based on the photograph and found to be 80° for the sample #1 and 70° for the sample #2.

When the sample #1 and the sample #2 after the ultraviolet irradiation were immersed in water, the surface of the photocatalytic coating well repelled methylene iodide which then became spherical, soon separated from the surface of the sample and floated on the surface of water, making it impossible to measure the contact angle.

Therefore, the contact angle of the sample with methylene iodide in water was determined by the following calculation.

In general, for the contact angle, θ, that, when an oil droplet is put on the surface of a solid followed by immersion of the solid in water, the oil droplet makes with the solid surface (that is, the contact angle of the solid surface with the oil in water), the following equation based on the Young's equation is applicable:

$$\gamma_{LW} \cos\theta = \gamma_{SW} - \gamma_{SL} \quad (6)$$

wherein $\gamma_{SW}$ represents the Gibbs free energy in the interface of the solid and water, $\gamma_{LW}$ represents the Gibbs free energy in the interface of the oil and water, and $\gamma_{SL}$ represents the Gibbs free energy in the interface of the solid and the oil. Accordingly, $$\cos\theta = (\gamma_{SW} - \gamma_{SL})/\gamma_{LW} \quad (7)$$

Further, according to the extended Fowkes equation established by Mr. Hata and Mr. Kitazaki, $\gamma_{SW}$, $\gamma_{SL}$, and $\gamma_{LW}$ are given respectively by the following equations:

$$\gamma_{SW} = \gamma_S + \gamma_W - 2\sqrt{\gamma_S^d \gamma_W^d} - 2\sqrt{\gamma_S^p \gamma_W^p} - 2\sqrt{\gamma_S^h \gamma_W^h} \quad (8)$$

$$\gamma_{SL} = \gamma_S + \gamma_L - 2\sqrt{\gamma_S^d \gamma_L^d} - 2\sqrt{\gamma_S^p \gamma_L^p} - 2\sqrt{\gamma_S^h \gamma_L^h} \quad (9)$$

$$\gamma_{LW} = \gamma_L + \gamma_W - 2\sqrt{\gamma_L^d \gamma_W^d} - 2\sqrt{\gamma_L^p \gamma_W^p} - 2\sqrt{\gamma_L^h \gamma_W^h} \quad (10)$$

wherein $\gamma_W$ represents the Gibbs free energy in the interface of water and the gas.

Therefore, if the kind of the oil is determined, $\gamma_{SW}$, $\gamma_{SL}$, and $\gamma_{LW}$ could be determined from the equations (8), (9), and (10). These values may be substituted for $\gamma_{SW}$, $\gamma_{SL}$, and $\gamma_{LW}$ in the equation (7) to calculate the contact angle θ of the solid surface with the oil in water.

For the sample #1 and the sample #2 prepared in Example 4, data before and after the ultraviolet irradiation described in the above Table 5 and the known values of the components in the surface energy of water and methylene iodide given in Table 4 were inserted into the equations (8) to (10) to determine the free energies $\gamma_{SW}$, $\gamma_{LW}$, and $\gamma_{SL}$, and the contact angle θ of the surface of the photocatalytic coating with methylene iodide in water is calculated by the equation (7). The results are summarized in the following Table 7.

TABLE 7

| Sample | $\gamma_{SW}$ | $\gamma_{SL}$ | $\gamma_{LW}$ | COSθ | θ |
|---|---|---|---|---|---|
| #1 (before UV irradiation) | 28.8 | 19.4 | 45.2 | 0.21 | 78 |
| #1 (after UV irradiation) | 11.5 | 28.9 | 45.2 | −0.39 | 113 |
| #2 (before UV irradiation) | 23.2 | 9.0 | 45.2 | 0.31 | 72 |
| #2 (after UV irradiation) | 13.4 | 28.8 | 45.2 | −0.34 | 110 |

As is apparent from Table 7, both the sample #1 and the sample #2 after the ultraviolet irradiation had a markedly increased contact angle θ with methylene iodide. This fact is in well agreement with the fact that, in the above experiment, the surface of the photocatalytic coating well repelled methylene iodide in water. Further, this means that immersion of a photocatalytic coating having an oil stain in water or wetting of such a photocatalytic coating with water permits the oil stain to be simply removed from the coating.

This phenomenon will be discussed. As is apparent from the above Table 5, the hydrogen bond component among the components of the surface energy constitutes the largest difference between water and the oil. Specifically, in the oil typified by methylene iodide, the hydrogen bond component $\gamma_L^h$ in the surface energy is generally small and close to zero, while in water, the hydrogen bond component $\gamma_W^h$ in the surface energy is as large as 42.4. Therefore, in the equation (8), increasing $\gamma_S^h$ results in a marked increase in $$\sqrt{\gamma_S^h \gamma_W^h}$$

and a decrease in $\gamma_S^W$.

On the other hand, in the equation (9), increasing $\gamma_S^h$ results in an increase in $\gamma_S$ by a magnitude corresponding to the increase in $\gamma_S^h$. Since, however, $\gamma_L^h$ is close to zero, $$\sqrt{\gamma_S^h \gamma_L^h}$$

does not change, resulting in increased $\gamma_{SL}$.

Therefore, it is considered that, as is apparent from the equation (7), the contact angle θ of the solid surface with the oil in water increases with increasing the hydrogen bond component $\gamma_S^h$ in the surface energy of the photocatalytic coating, rendering the surface of the photocatalytic coating oil-repellent in water.

Example 6

Oil repellency in Water—Oleic Acid

A glass plate coated with a base coat of amorphous silica and a top coat of amorphous titania was prepared in the same manner as in Example 4. The glass plate was fired at 475° C. to transform the amorphous titania into the anatase form of titania.

Subsequently, the surface of the sample was irradiated with ultraviolet light using a black light blue fluorescent lamp (FL20BLB) at an irradiation intensity of 0.5 mW/cm² for about one hr.

Oleic acid was dropped on this sample and a soda-lime glass plate with no photocatalytic coating in air, and the contact angle in air of the surface of the samples with oleic acid was measured As a result, for both samples, the contact angle in air with oleic acid was 35°.

Thereafter, each sample was immersed in water, and the contact angle in water of the samples with oleic acid was then measured. As a result, the contact angle was 85° for the glass plate with a photocatalytic coating and 38.5° for the glass plate with no photocatalytic coating. Thus, it was confirmed that the photoexcited photocatalytic coating exhibits oil repellency in water.

Example 7

Oil Repellency of Photocatalyst-Containing Silicone Coating in Water

A 10-cm square aluminum plate was provided as a substrate. The substrate was previously coated with a silicone resin coating to smoothen the surface thereof.

Subsequently, trimethoxymethylsilane (liquid B of "Glasca," a paint composition manufactured by Japan Synthetic Rubber Co., Ltd.), a precursor of a silicone, was added to a nitric acid peptization-type titania (anatase form) sol (available form Nissan Chemical Industries Ltd. under the designation TA-15, average particle diameter 0.01 μm). In this case, the titania sol was added in such an amount that the proportion of titania to the total weight on a solid basis of titania and silicone was 50% by weight. The mixture was diluted with propanol, and a curing agent was added to prepare a titania-containing silicone paint.

The titania-containing silicone paint was coated on an aluminum plate, and the coating was cured at 150° C. to form a top coat with particles of titania in an anatase form dispersed in a silicone coating.

This sample was irradiated with ultraviolet light using a black light blue fluorescent lamp (FL20BLB) at an irradiation intensity of 0.5 mW/cm² for about one day. The water absorption of the sample was less than 1%.

A salad oil was dropped on this sample and an aluminum plate with no titania-containing silicone coating in air, and the contact angle of the surface of these samples with the salad oil was measured. The contact angle of the samples with the salad oil in air was 22° for the sample having a titania-containing silicone coating and 39° for the sample not having any titania-containing silicone coating.

Thereafter, each sample was immersed in water, and the contact angle of each sample with the salad oil in water was measured. The contact angle of the samples with the salad oil in water was 105° for the glass plate with a titania-containing silicone coating and 35° for the glass plate with no titania-containing silicone coating.

When the sample coated with a titania-containing silicone was vibrated by flicking the sample with a finger, the salad oil adhered onto the surface of the sample separated from the surface of the sample and floated on the water. On the other hand, for the sample with no titania-containing silicone coating, the salad oil remained in an adhered state and spread over the surface of the sample.

From the above results, it is considered that photoexcitation of a photocatalyst by irradiation of a silicone coating containing a photocatalyst causes the surface of the coating to be hydrophilified by the photocatalytic action to increase the hydrogen bond component in the surface energy, increasing the oil repellency of the coating in water.

Example 8

Photocatalytic Coating Bearing Sulfuric Acid

Two soda-lime glass plates coated with a base coat of amorphous silica and a top coat of amorphous titania were prepared in the same manner as in Example 1.

Figure 8:
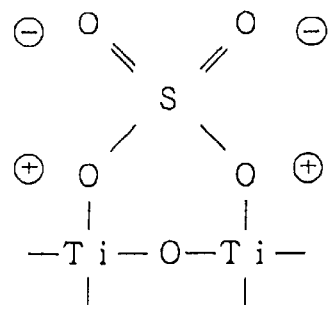
FIG. 8 is a microscopically enlarged, schematic cross-sectional view of a solid/gas interface of a photocatalytic coating bearing sulfuric acid.

The surface of one of the glass plates was coated with about 0.8 ml of a 5 wt % aqueous sulfuric acid solution to form a coating which was then fired at about 525° C. to prepare a sample #1. The firing transforms the amorphous titania into the anatase form of titania and, at the same time, as shown in FIG. 8, causes a sulfonic group to be bonded to the titanium atom on the surface of titania to form a titania bearing sulfuric acid.

For comparison, the other glass plate was fired, without coating of sulfuric acid, at about 525° C., the same temperature as used in the case of the above substrate, to transform the amorphous titania into the anatase form of titania, thereby preparing a sample #2.

Figure 9:
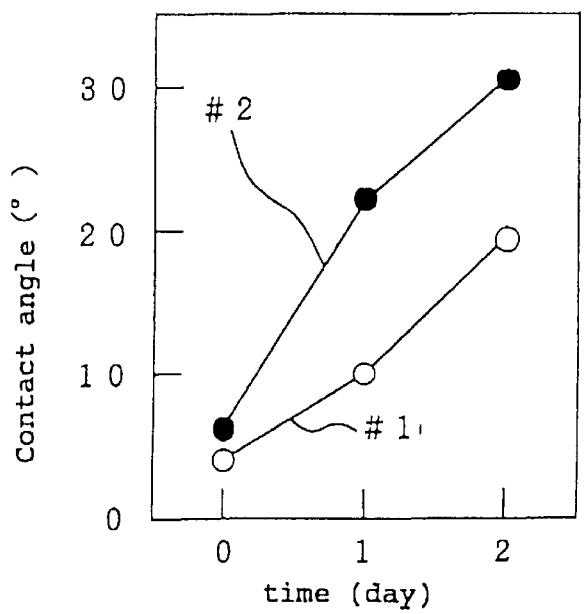
FIG. 9 is a graph showing a change in contact angle of a photocatalytic coating, bearing sulfuric acid or not bearing sulfuric acid, with water, when allowed to stand in a dark place, as a function of standing time in the dark place, in a certain working example.

Each sample was allowed to stand in a dark place for two days, during which time the contact angle of the surface of the samples with water was measured. A change in contact angle with the elapse of time is shown in FIG. 9. From the graph in FIG. 9, it is noteworthy that as compared with the sample #2 not bearing sulfuric acid, the sample #1 having a surface bearing sulfuric acid, when allowed to stand in a dark place, exhibits a lower degree of increase in contact angle, that is, better retention of hydrophilicity observed immediately after the firing, meaning that the time taken for the surface of the sample to be rendered hydrophobic is increased.

After standing in the dark room for two days, the surface of the sample #1 and the sample #2 was irradiated with ultraviolet light using a black light blue fluorescent lamp (FL20BLB) at an irradiation intensity of 0.5 mW/cm², and a change in contact angle of the surface of the samples with water as a function of the irradiation time was determined. The results are shown in FIG. 10.

Figure 10:
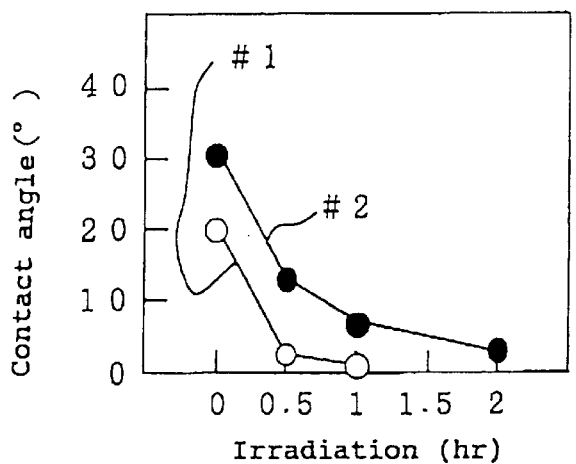
FIG. 10 is a graph showing a change in contact angle of a photocatalvtic coating with water upon re-photoexcitation as a function of light irradiation time.

As is apparent the graph in FIG. 10, the sample #2 not bearing sulfuric acid requires 2 hr for the sample to be hydrophilified to a contact angle thereof with water of less than 3°, whereas for the sample #1 having a surface bearing sulfuric acid, only one hr is required for the hydrophilification to the same level of contact angle. The above results show that bearing sulfuric acid on the surface of the coating accelerates the hydrophilification of the photocatalytic coating upon photoexcitation of the photocatalyst after standing in a dark place.

Figure 11:
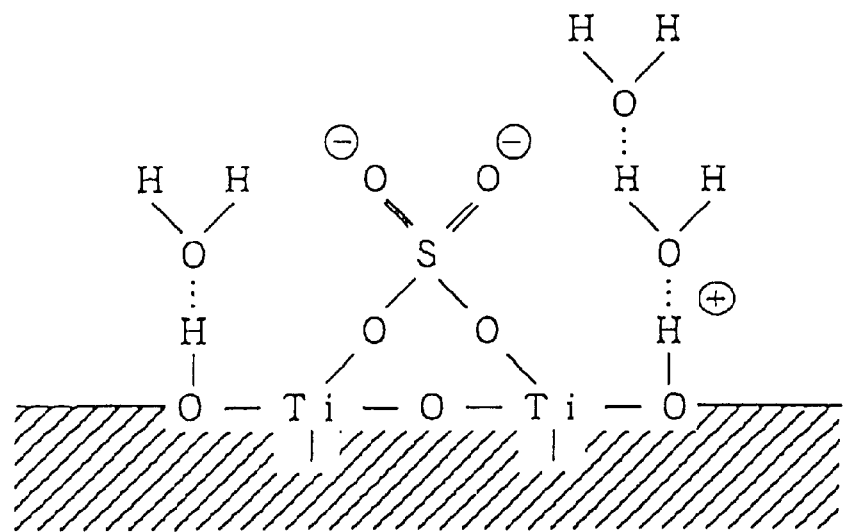
FIG. 11 is a diagram, similar to FIG. 8, illustrating the physical adsorption of molecules of water onto a bridge OH group present on the surface of titania bearing sulfuric acid.
Figure 12:
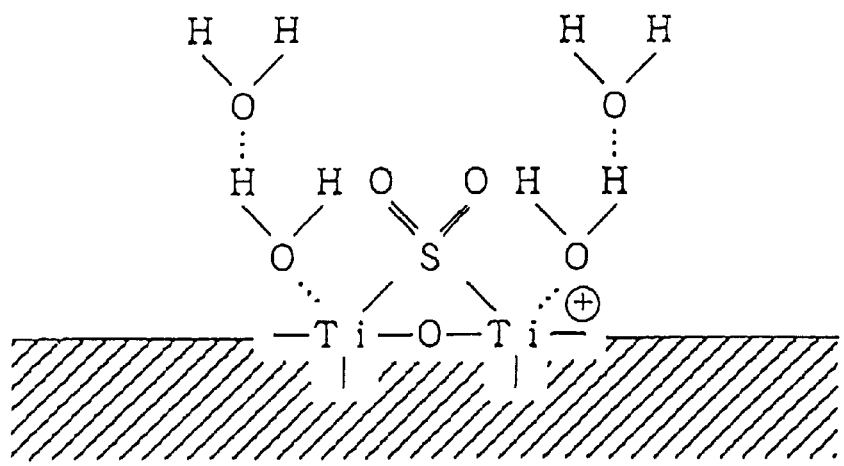
FIG. 12 is a diagram, similar to FIG. 8, illustrating bonding of molecules of water onto a titanium atom to the surface of titania bearing sulfuric acid.

It is considered that, as shown in FIG. 11, the presence of a sulfonic group permits the hydrogen atom in a bridge OH group on the surface of titania functions as a Brønsted acid site (a proton donating site) to accelerate the physical adsorption of molecules of water, or otherwise, as shown in FIG. 12, the titanium atom on the surface of the titania functions as a Lewis acid site (an electron accepting site) to accelerate the physical adsorption of molecules of water, increasing the amount of the physically adsorbed water on the surface of the coating.

Example 9

Photocatalytic Coating Bearing $TiO_2/WO_3$

Ammonia peptization-type anatase sol (STS-11, manufactured by Ishihara Sangyo Kaisha Ltd.) (1 g) was mixed with 2 g of 25% aqueous ammonia containing tungstic acid dissolved therein, and 2 g of distilled water was added to the mixture to prepare a coating liquid. The molar ratio of the titania particles to the tungstic acid in the coating liquid was 10:1.

The coating liquid was coated on a glazed title (AB02Ell, manufactured by TOTO, LTD.) having a size of 5×10 cm, and the coating was fired for 30 min at 700° C. to prepare a sample #1 with a coating, of the anatase form of titania, bearing $TiO_2/WO_3$. No color development derived from the surface coating was observed.

For comparison, the titania sol (STS-11) was coated on the same type of glazed title (AB02E11) as used above, and the coating was fired for 30 min at 700° C. to prepare a sample #2 with a coating of titania alone.

Immediately after the firing, the contact angle of each sample with water was measured. As a result, the contact angle was 9° for the sample #2, while the sample #1 was as low as 1°. This indicates that immediately after the firing, a titania coating bearing $TiO_2/WO_3$ can exhibit high hydrophilicity.

Each sample was then allowed to stand for one day in a dark place to determine a change in contact angle of the surface of the samples with water. As a result, the contact angle of the sample #2 with water was increased to 40°, whereas the sample #1 retained the low contact angle, i.e., had a contact angle of less than 5°. After standing of the sample #1 in a dark place for additional 4 days, the sample #1 retained the contact angle on a low level of about 5°.

Thereafter, the surface of the sample #1 was irradiated with ultraviolet light using a black light blue fluorescent lamp (FL20BLB) at an irradiation intensity of 0.5 mW/cm$^2$ for about 2 hr. As a result, the surface of the sample #1 was superhydrophilified to a contact angle thereof with water of 0°.

Oleic acid was coated on the surface of the sample #1 and the sample #2, and these samples were then rubbed with a neutral detergent, rinsed with tap water and distilled water, and dried in a drier for 30 min at 50° C. to intentionally contaminate the surface of the samples. As a result, the contact angle of the samples with water was increased to 30 to 40°.

The surface of the sample #1 was then irradiated with ultraviolet light using a black light blue fluorescent lamp at an irradiation intensity of 0.3 mW/cm$^2$ for about 2 hr. This resulted in superhydrophilification of the sample to a contact angle of the sample with water of 0°. On the other hand, the surface of the sample #2 was irradiated with ultraviolet light at an irradiation intensity of 0.3 mW/cm$^2$ for about one day. After the ultraviolet irradiation, the contact angle of the sample #2 with water was 9°.

Example 10

Firing Temperature of Coating Bearing $TiO_2/WO_3$

Two tiles with a coating, of the anatase form of titania, bearing $TiO_2/WO_3$ were prepared in the same manner as in Example 9, except that the firing temperature was varied. The firing temperature of the sample #1 was 600° C., and the firing temperature of the sample #2 was 750° C.

Immediately after the firing, the contact angle of both the samples with water was as low as 1°. These samples were then allowed to stand in a dark place for one day, and the contact angle of the surface of each sample with water was measured again. As a result, the samples retained the contact angle on a low level of less than 5°.

Thereafter, these samples were intentionally contaminated with oleic acid and a neutral detergent in the same manner as in Example 9. As a result, the contact angle with water increased to 50° for the sample #1 and to 60° for the sample #2.

The samples were then irradiated with ultraviolet light at an irradiation intensity of 0.3 mW/cm$^2$ for about 2 hr. This resulted in superhydrophilification of both the samples to a contact angle with water of 0°.

Example 11

Ratio of $TiO_2$ to $WO_3$ in Coating Bearing $TiO_2/WO_3$

In the same manner as in Example 9, four coatings with the tungstic acid being varied were prepared and then coated on tiles, followed by firing to prepare four tiles #1 to #4 with a coating of the anatase form of titania bearing $TiO_2/WO_3$. The molar ratio of the titania particles to the tungstic acid in the coating liquid used was 20:1 for the sample #1, 100:1 for the sample #2, 200:1 for the sample #3, and 1000:1 for the sample #4. For all the samples, the firing was performed at 700° C.

Immediately after the preparation, the samples were intentionally contaminated with oleic acid and a neutral detergent in the same manner as in Example 9. They were then irradiated with ultraviolet light at an irradiation intensity of 0.3 mW/cm$^2$ for about one day. As a result, after the ultraviolet irradiation, all the samples had a low contact angle with water of 1°.

Thereafter, the samples were allowed to stand in a dark place for one day, and the contact angle of the surface of the samples with water was measured. As a result, the samples retained the low contact angle with water, that is, had a contact angle with water of less than 10° for the samples #1 and #2, 8° for the sample #3, and 9° for the sample #4.

This example demonstrates that, when $TiO_2/WO_3$, a composite of metal oxides, is borne on a photocatalytic coating, the hydrophilicity is retained after the interruption of the photoexcitation of the photocatalyst.

Example 12

Formation of Photocatalytic Coating by Sputtering

An amorphous titania film was formed on the surface of a 10-cm square soda-lime glass plate by electron beam deposition, and the titania film was fired at 500° C. to crystallize the amorphous form of titania, thereby producing the anatase form of titania. The thickness of the titania (anatase form) film was 100 nm.

Tungstic acid dissolved in 25% aqueous ammonia was coated on the titania (anatase form) film at a coverage of 0.6 $\mu g/cm^2$ in terms of the weight of tungstic acid, and the coating was fired at 500° C. to prepare a sample.

Immediately after the firing, the contact angle of the surface of the sample with water was as low as 2°.

The sample was then allowed to stand in a dark place for one day, followed by measurement of the contact angle of the surface of the sample with water to determine a change in contact angle of the sample with the elapse of the time. As a result, the sample retained the contact angle on a low level, that is, had a contact angle with water of 9°.

Thereafter, the surface of the sample was irradiated with ultraviolet light at an irradiation intensity of 0.3 mw/cm$^2$ for one day. After the ultraviolet irradiation, the contact angle of the sample with water was measured and found to be 0°, indicating that the surface of the sample was highly hydrophilified.

Example 13

Formation of Photocatalytic Coating Using Alkoxide

Tetraethoxysilane as a precursor of silica and ethanolamine as a hydrolysis inhibitor were added to ethanol to prepare a silica coating solution having a tetraethoxysilane concentration of 3.5% by weight. A 10-cm square soda-lime plate was immersed in this solution and then pulled up at a rate of 24 cm per min to dip-coat the surface of the glass plate with the above solution, followed by drying. This first caused tetraethoxysilane to be hydrolyzed to give silanol which subsequently underwent dehydration polycondensation to form a thin film of amorphous silica on the surface of the glass plate.

Separately, tetraethoxytitanium as a precursor of titania and ethanolamine as a hydrolysis inhibitor were added to ethanol to prepare a titania coating solution having a tetraethoxytitanium concentration of 3.5% by weight. The glass plate with the film of amorphous silica previously coated thereon was immersed in the titania coating solution and then pulled at a rate of 24 cm per min to dip-coat the surface of the coated glass plate with the titania coating solution, followed by drying. This first caused tetraethoxytitanium to be hydrolyzed to give titanium hydroxide which then underwent dehydration polycondensation to form an amorphous titania film (thickness: about 50 nm) on the surface of the coated glass plate.

The glass plate was then immersed in an aqueous solution of tungstic acid dissolved in a concentration of 0.25% by weight in a 25% aqueous ammonia solution and pulled up at a rate of 24 cm per min to dip-coat the surface of the glass plate with the solution, followed by firing at 500° C. to prepare a sample #1. The firing resulted in the crystallization of the amorphous titania to produce the anatase form of titania. It is considered that a double oxide of $TiO_2/WO_3$ also is produced at least in the interface of the titania film and the tungsten film.

For comparison, a glass plate not coated with the aqueous tungstic acid solution was fired at 500° C. to prepare a sample #2. The firing resulted in the crystallization of the amorphous titania to produce the anatase form of titania.

Immediately after the firing, the surface of the sample #1 and the sample #2 was coated with oleic acid, rubbed with a neutral detergent, rinsed with tap water and distilled water, and dried in a drier for 30 min at 50° C. to intentionally contaminate the surface of the samples Thereafter, the surface of the samples was irradiated with ultraviolet light at an irradiation intensity of 0.3 mW/cm² for one day, and the contact angles of the surface of the samples with water was measured. As a result, for both the samples, the contact angle of the surface with water was as low as 1°.

Subsequently, the samples were allowed to stand in a dark place for 6 hr, and the contact angle of the surface of the samples with water was measured again to determine a change in contact angle of the samples with water. As a result, the contact angle of the sample #2 with water was increased to 22°, whereas the sample #1 retained the low contact angle, i.e., had a contact angle of 7°.

Example 14

Photocatalytic Coating Bearing Sulfuric Acid and $TiO_2/WO_3$

In the same manner as in Example 13, a soda-lime glass plate was coated first with a thin film of amorphous silica and then with a thin film of amorphous titania.

The coated glass plate was then immersed in a 1% aqueous ammonia solution containing 0.25% by weight of tungstic acid and 0.33% by weight of ammonium sulfate dissolved therein and pulled up at a rate of 24 cm per min to dip-coat the surface of the glass plate with the solution, followed by firing at 500° C. to prepare a sample. The firing resulted in the crystallization of amorphous titania to form a photocatalytic coating of anatase on the surface of the plate. It is considered that, in addition to the formation of the photocatalytic coating of anatase, a double oxide of $TiO_2/WO_3$ also is produced on the surface of the photocatalytic coating and, further, the sulfonic group is bonded to the titanium atom on the surface of the titania.

Immediately after the firing, the surface of the sample was intentionally contaminated with oleic acid and a neutral detergent in the same manner as in Example 13. This caused the contact angle of the sample with water to be increased 35°.

Thereafter, the surface of the sample was irradiated with ultraviolet light at an irradiation intensity of 0.3 mW/cm² for one day, and the contact angle of the sample with water was measured again and found to be as low as 0°.

The sample was then allowed to stand in a dark place for one day, and the contact angle of the surface of the sample with water was measured again to determine a change in contact angle. As a result, the surface of the sample retained the contact angle on a low level, i.e., had a contact angle with water of 9°.

What is claimed is:

1. A method for hydrophilifying the surface of a substrates comprising the steps of:
    providing a substrate coated with a solid layer having an interface with air, and containing a photoatalyst; and
    photoexciting the photocatalyst to permit molecules of water to be physically adsorbed onto the surface of said layer under the photocatalytic action of said photoctalyst, thereby hydrophilifying the surface of said substrate.

2. A method for hydrophilifying the surface of a substrate, comprising the steps of:
    providing a substrate coated with a solid layer having an interface with air, said layer containing a photocatalyst, and, at said interface, a hydrogen bond component, $\gamma_S^h$; and
    photoexciting the photocatalyst to increase said hydrogen bond component under the photocatalytic action of said photocatalyst.

3. A method for hydrophilifying the surface of a substrate, comprising the steps of:
    providing a substrate coated with a solid layer having an interface with air, said layer containing a photocatalyst, and having, at said interface, a hydrogen bond component, $\gamma_S^h$; and
    photoexciting the photocatalyst to increase said hydrogen bond component under the photocatalytic action of said photocatalyst, thereby accelerating the physical adsorption of molecules of water onto the surface of said layer.

4. The method according to any one of claims 1 to 3, wherein said layer further comprises an enhancing agent for increasing the hydrogen bond component, $\gamma_S^h$, in the surface energy at the interface between said layer and air.

5. The method according to claim 4, wherein said solid layer has a high hydrogen bond component in the surface energy at said interface.

6. The method according to claim 5, wherein the material that increases a hydrogen bond component in the surface energy comprises a solid acid.

7. The method according to claim 6, wherein the solid acid is a metal oxide bearing sulfuric acid.

8. The method according to claim 6, wherein the solid acid is a metal oxide bearing nitric acid.

9. The method according to claim 6, wherein the solid acid is a compound oxide of metals.

10. The method according to claim 9, wherein the compound oxide of metals is an oxide superstrong acid.

11. The method according to claim 9, wherein the metal oxide composite is selected from the group consisting of $TiO_2/WO_3$, $WO_3/ZrO_2$, and $WO_3/SnO_2$.

12. The method according to claim 6, wherein the solid acid is $Al_2O_3 \cdot SiO_2$.

13. The method according to claim 5, wherein the material that increases said hydrogen bond component in the surface energy is a solid base.

14. A method for enhancing the oil repellency of the surface of a the substrate in water, comprising the steps of:
providing a substrate coated with a solid layer having an interface with air, and containing a photocatalyst; and
photoexciting the photocatalyst to increase a hydrogen bond component, in the surface energy in the solid/gas interface of said layer under the photocatalytic action of said photocatalyst, thereby enhancing the oil repellency of the surface of the substrate when placed in water.

15. A method for cleaning a substrate, comprising the steps of:
providing a substrate coated with a solid layer having an interface with air, and containing a photocatalytic semiconductor material;
photoexciting the photocatalyst to enhance a hydrogen bond component, $\gamma_S^h$, in the surface energy in the solid/gas interface of said layer tinder the photoctalytic action of said photocatalyst, thereby enhancing the oil repellency of the surface of the substrate when placed in water; and
immersing the substrate in water or wetting the substrate with water to release an oil stain adhering on the surface of the substrate.

16. A composite with a hydroplilifiable surface, comprising:
a substrate;
a solid layer provided on the surface of the substrate and having an interface with air, said layer containing a photocatalyst; and
a layer of molecules of water physically adsorbed onto the surface of said layer containing a photocatalyst in response to the photoexcitation of the photocatalyst.

17. A composite with a hydrophilifiable surface, comprising:
a substrate; and
a solid layer provided on the surface of the substrate and having an interface with air, said layer containing a photocatalyst and adapted to increase the hydrogen bond component, $\gamma_S^h$, in the surface energy at said interface in response to the photoexcitation of said photocatalyst.

18. A composite with a hydrophilifiable surface, comprising:
a substrate;
a solid layer provided on the surface of the substrate and having an interface with air, said layer containing a photocatalyst and adapted to increase the hydrogen bond component, $\gamma_S^h$, in the surface energy at said interface in response to photoexcitation of said photocatalyst; and
a layer of molecules of water physically adsorbed onto the surface of said layer containing a photocatalyst in response to the photoexcitation of the photocatalyst.

19. A composite with a surface adapted to be rendered oil repellent in water, comprising:
a substrate;
a solid layer provided on the surface of the substrate and having an interface with air, said layer containing a photocatalyst and adapted to increase the hydrogen bond component, $\gamma_S^h$, in the surface energy at said interface in response to photoexcitation of said photocatalyst, thereby increasing the oil repellency of the surface of the composite in water.

20. A composite with an easily cleanable surface, comprising:
a substrate; and
a solid layer provided on the surface of the substrate and having an interface with air, said layer containing a photocatalyst,
said layer operating to increase the hydrogen bond component, $\gamma_S^h$, in the surface energy at said interface in response to photoexcitation of the photocatalyst, thereby enhancing the oil repellency of the surface of the composite in water, whereby, upon immersion of the composite in water or wetting of the composite with water, an oil stain adhering on the surface of said layer is released therefrom.

21. The method according to any one of claims 16 to 20, wherein said layer further comprises an enhancing agent for increasing the hydrogen bond component, $\gamma_S^h$, in the surface energy at the interface between said layer and air.

22. The composite according to claim 21, wherein the agent that increases a hydrogen bond component in the surface energy comprises a solid acid.

23. The composite according to claim 22, wherein the solid acid is a metal oxide bearing sulfuric acid.

24. The composite according to claim 22, wherein the solid acid is a metal oxide bearing nitric acid.

25. The composite according to claim 22, wherein the solid acid is a compound oxide of metals.

26. The composite according to claim 25, wherein the compound oxide of metals is an oxide superstrong acid.

27. The composite according to claim 25, wherein the compound oxide of metals is selected from the group consisting of $TiO_2/WO_3$, $WO_3/ZrO_2$, and $WO_3/SnO_2$.

28. The composite according to claim 22, wherein the solid acid is $Al_2O_3 \cdot SiO_2$.

29. The composite according to claim 21, wherein the agent that increases a hydrogen bond component in the surface energy is a solid base.

* * * * *